Dec. 27, 1938.  T. L. GREEN  2,141,859
APPARATUS FOR USE IN MANUFACTURING BISCUIT AND THE LIKE
Original Filed April 22, 1933  24 Sheets—Sheet 1
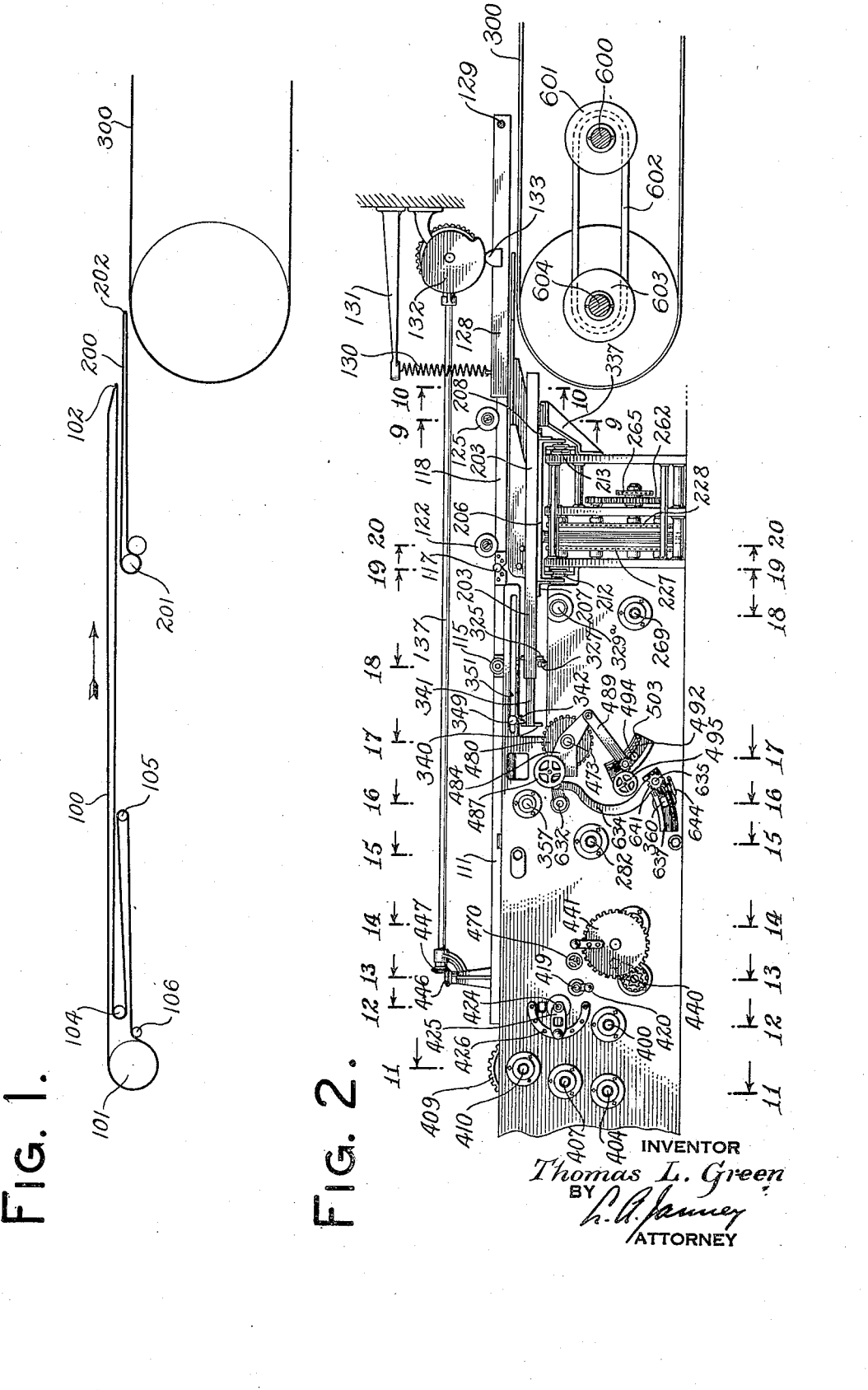
INVENTOR
Thomas L. Green
BY
/ATTORNEY

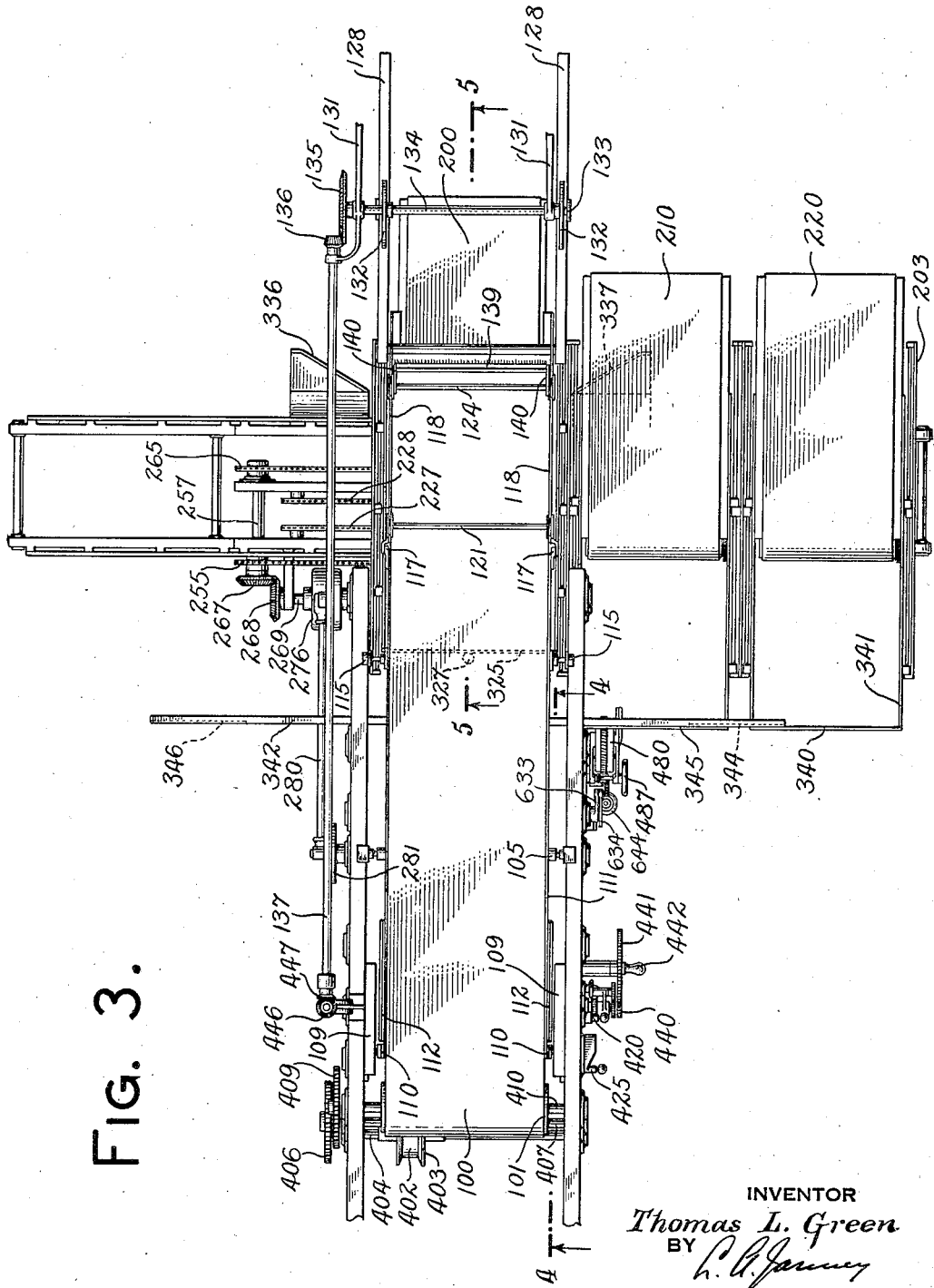

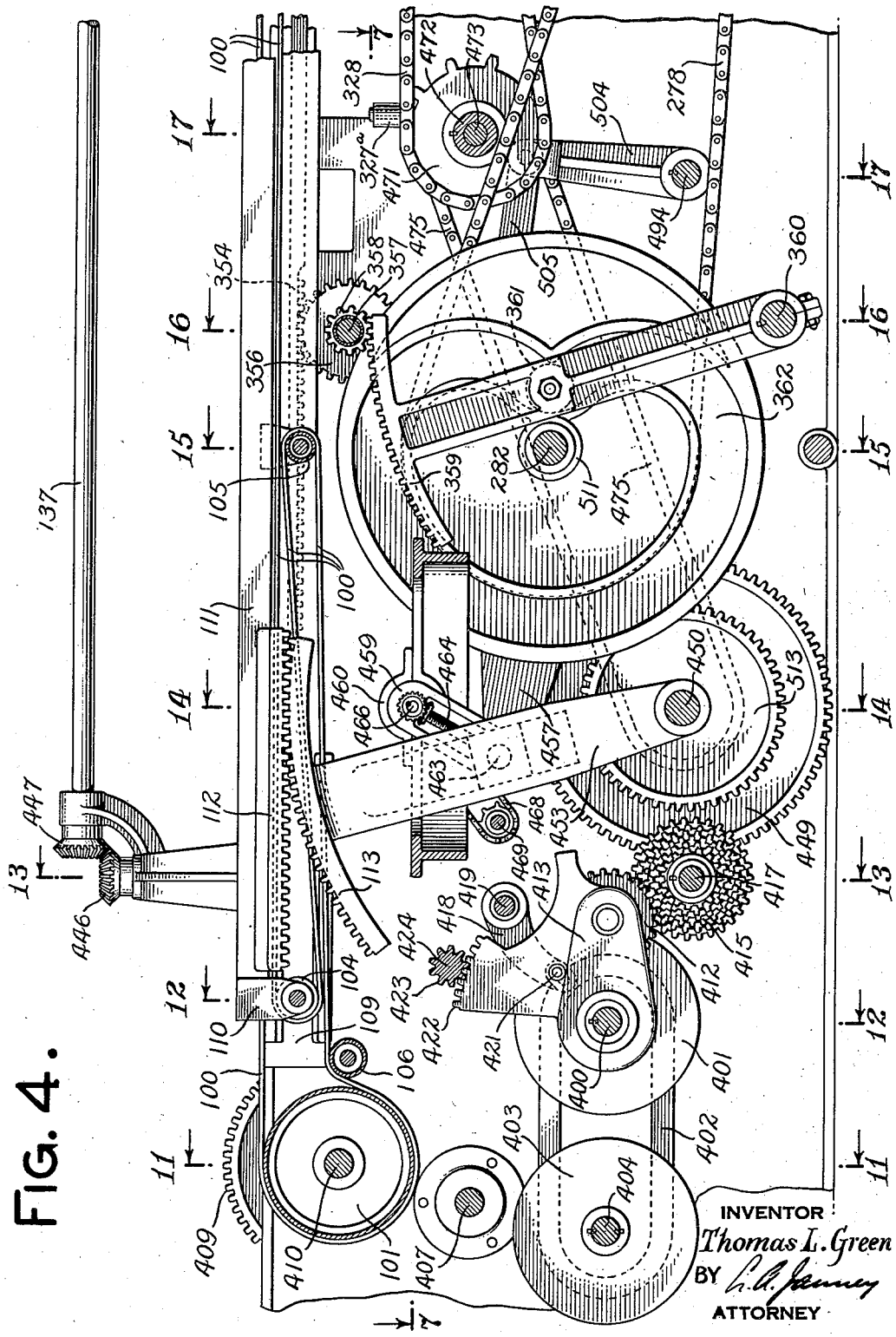

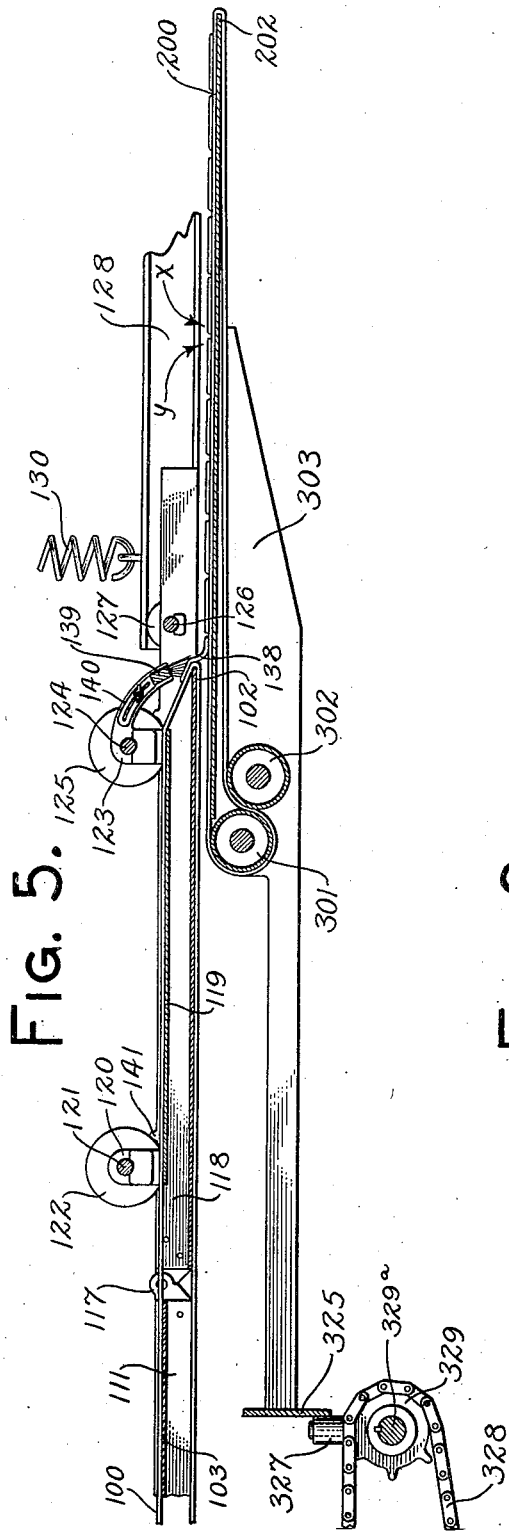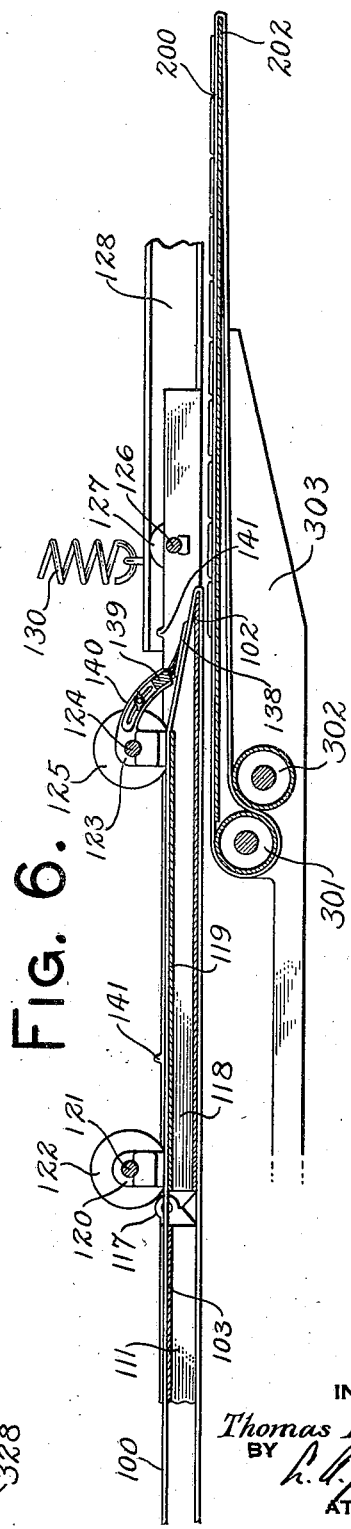

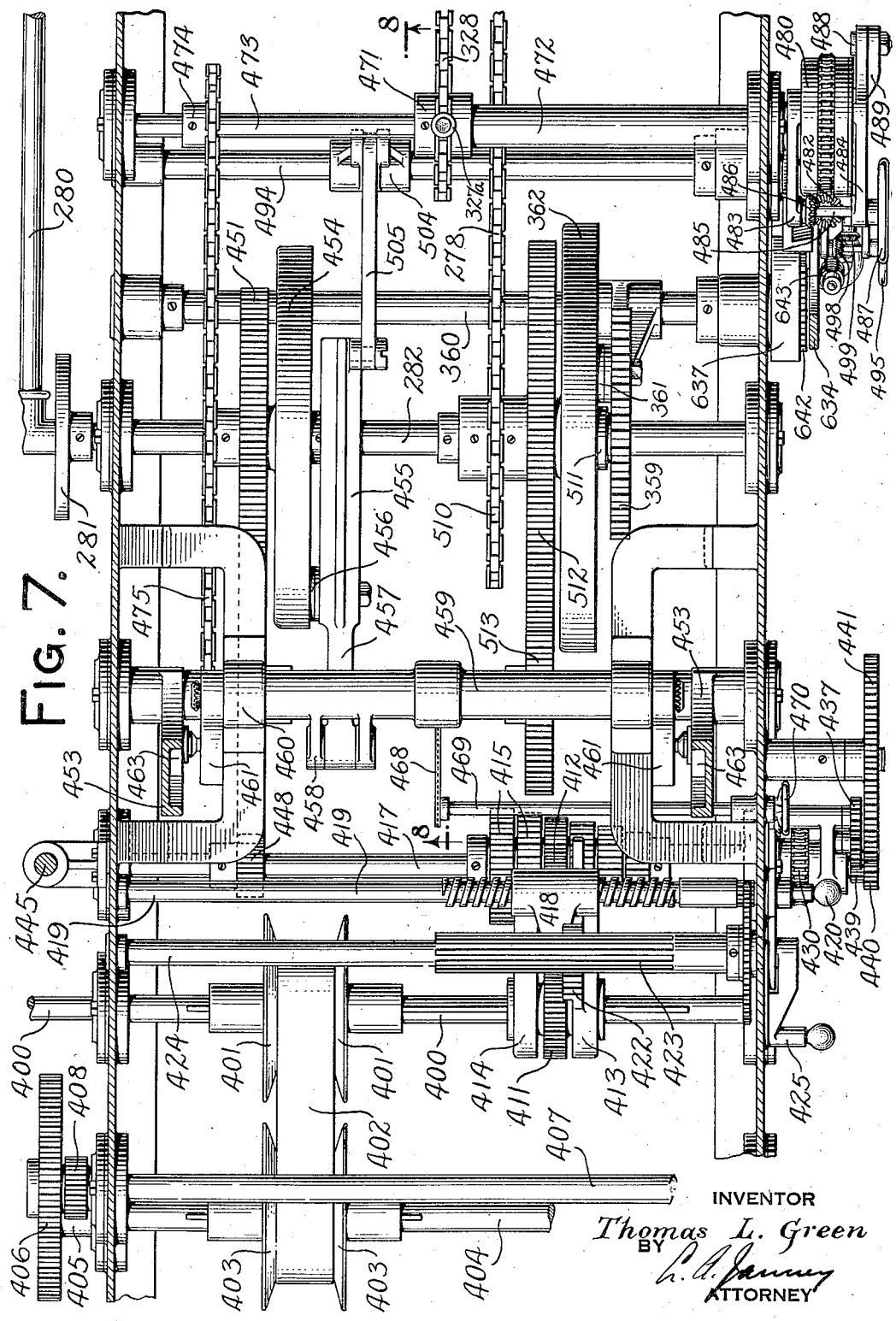

Dec. 27, 1938.  T. L. GREEN  2,141,859
APPARATUS FOR USE IN MANUFACTURING BISCUIT AND THE LIKE
Original Filed April 22, 1933  24 Sheets—Sheet 6

INVENTOR
Thomas L. Green
BY
ATTORNEY

Dec. 27, 1938. T. L. GREEN 2,141,859
APPARATUS FOR USE IN MANUFACTURING BISCUIT AND THE LIKE
Original Filed April 22, 1933 24 Sheets-Sheet 11

INVENTOR
Thomas L. Green
BY
ATTORNEY

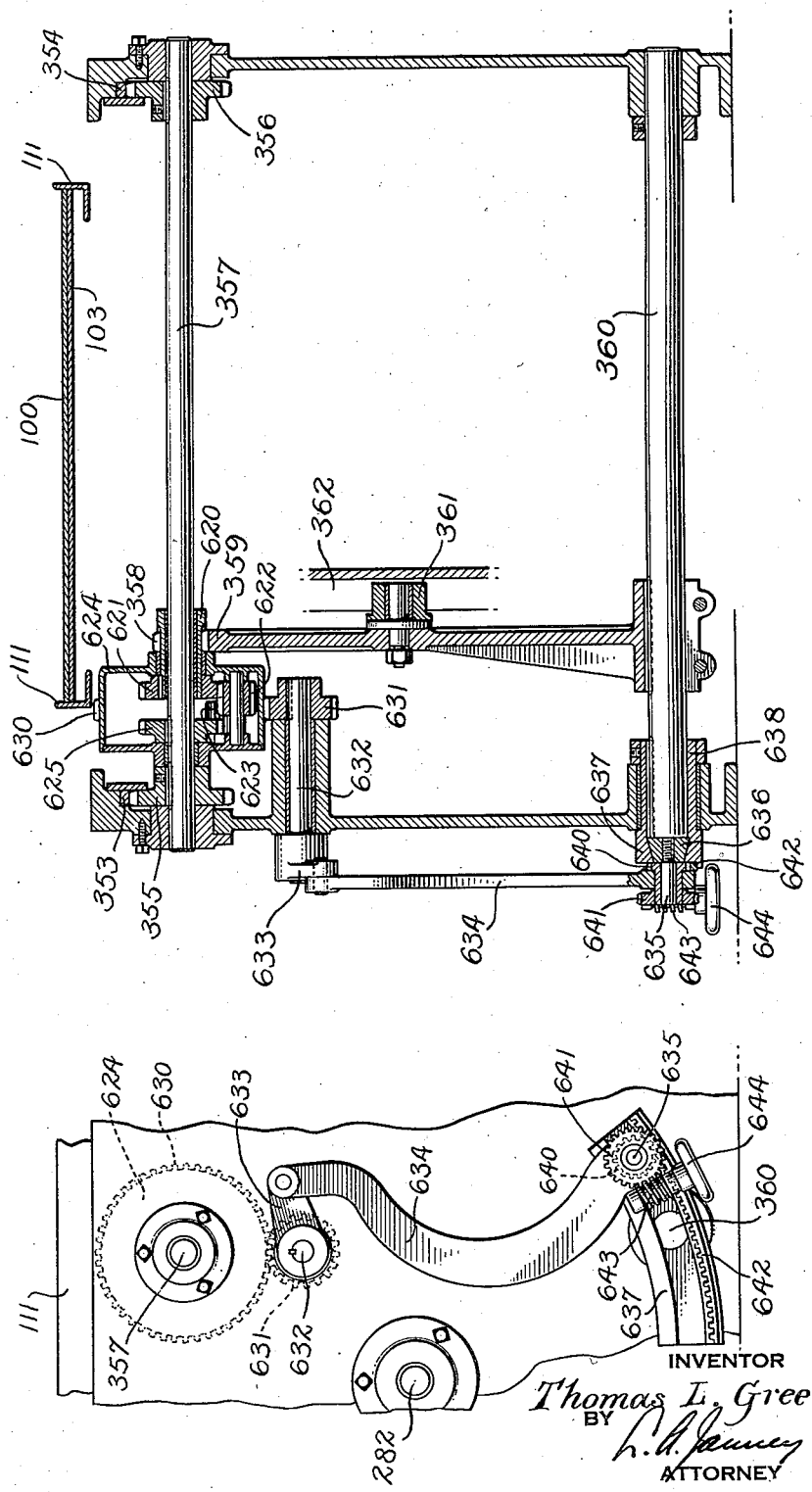

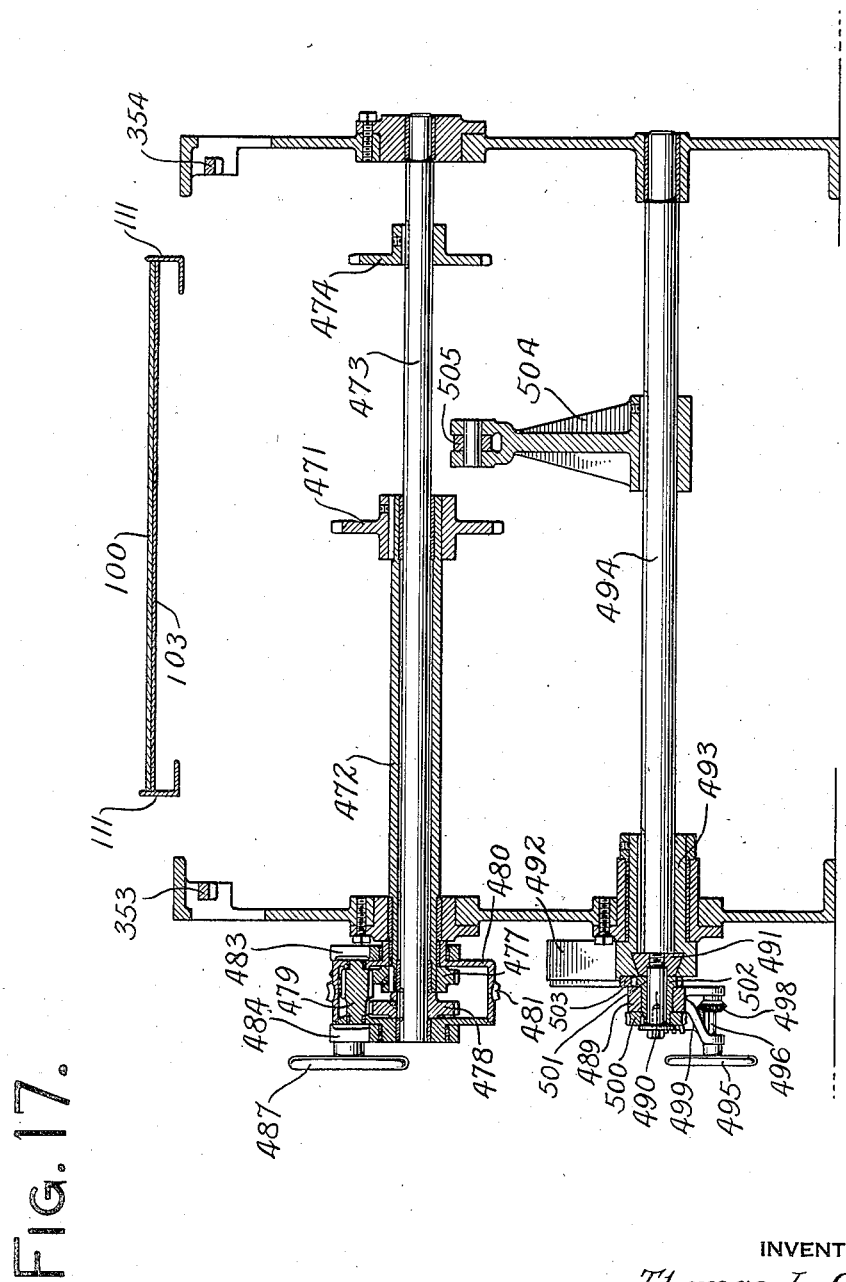

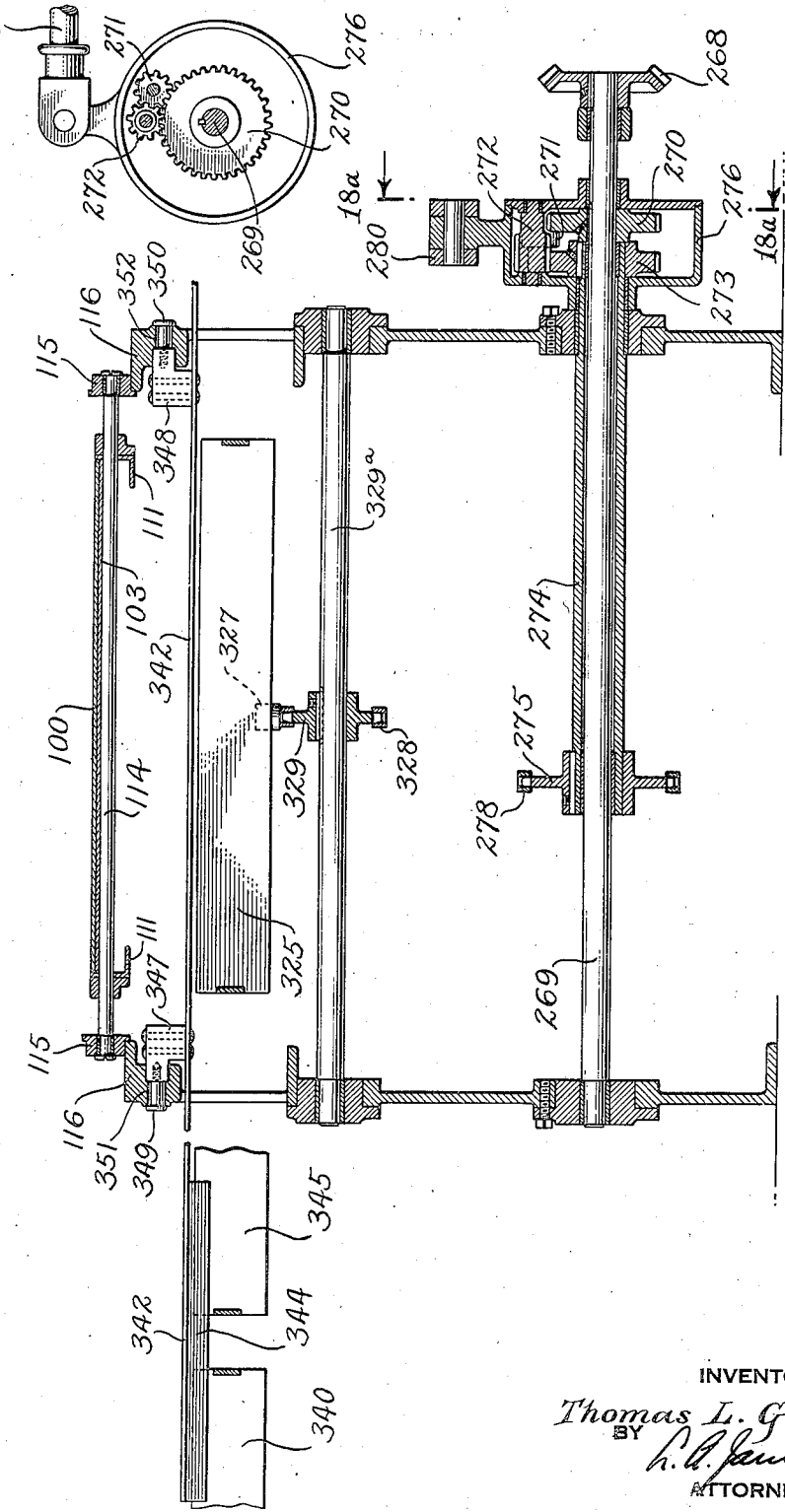

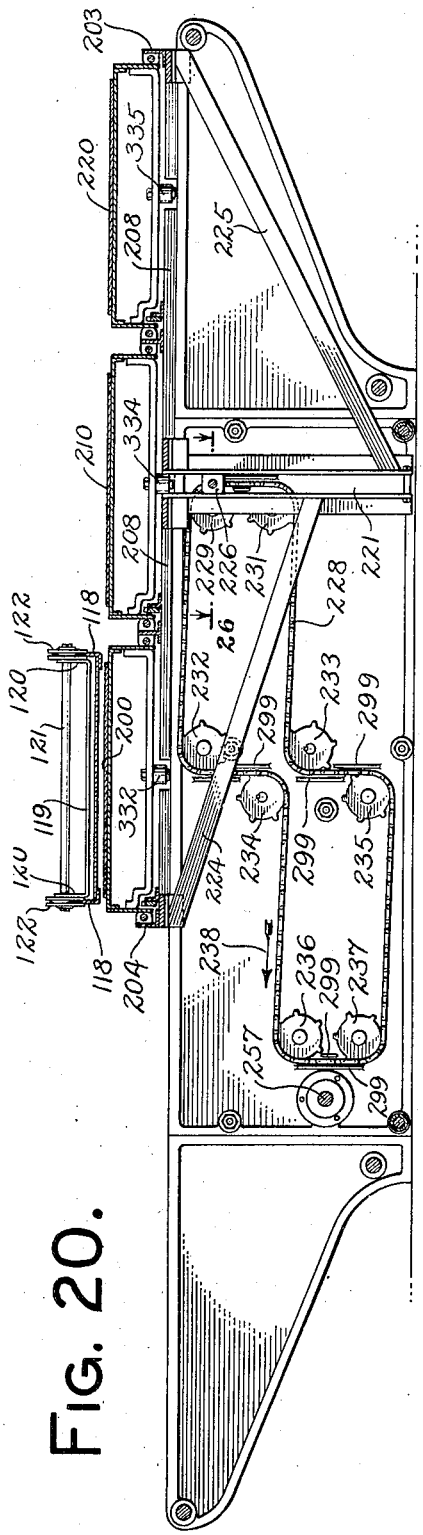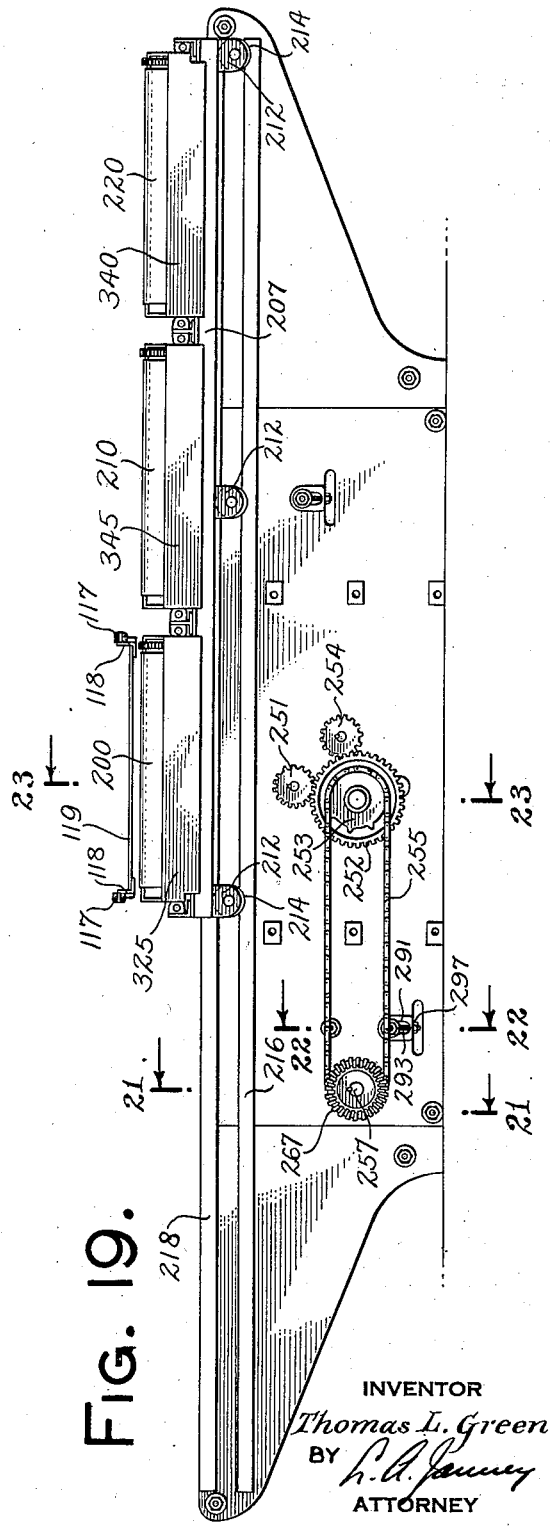

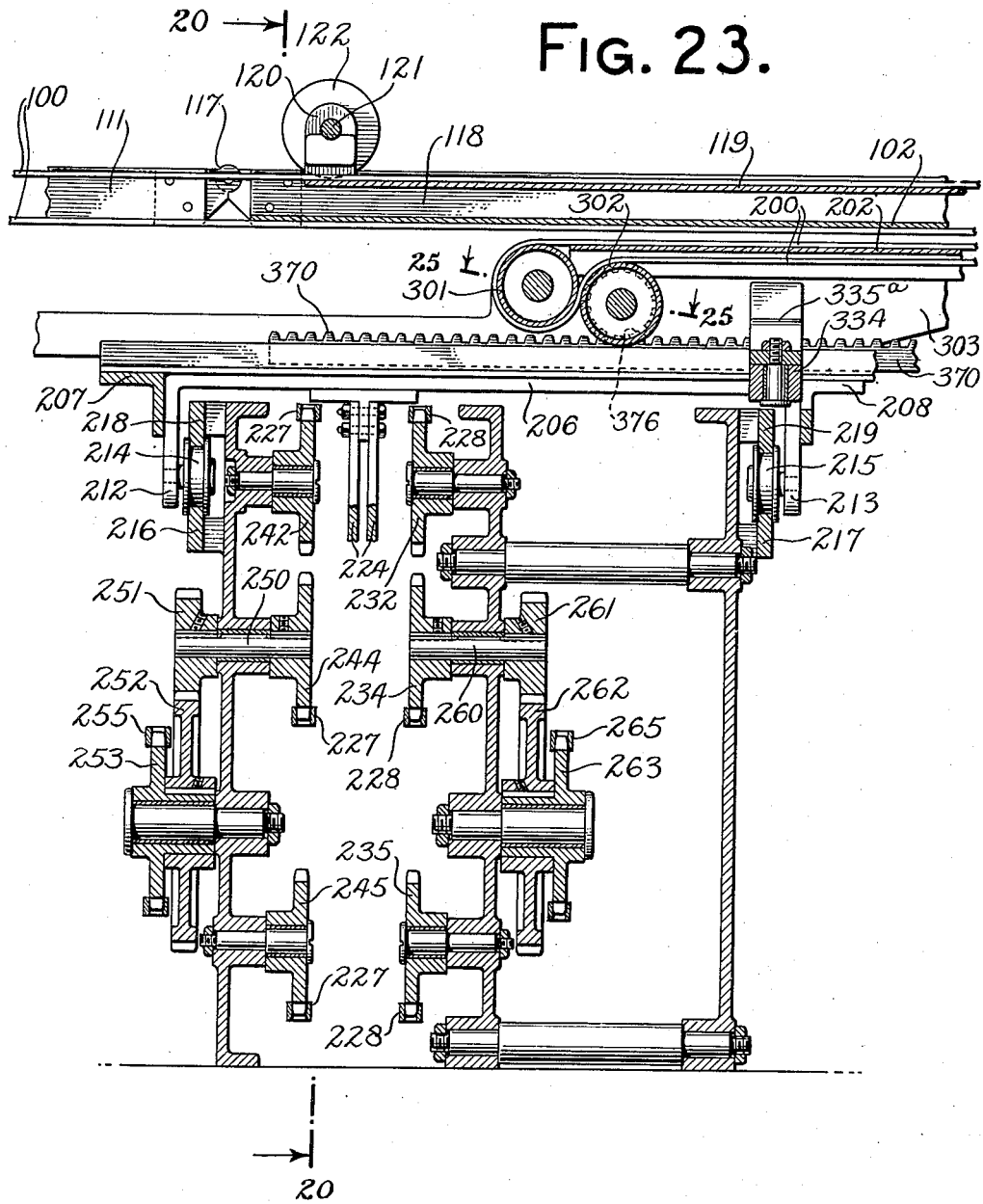

Dec. 27, 1938.  T. L. GREEN  2,141,859
APPARATUS FOR USE IN MANUFACTURING BISCUIT AND THE LIKE
Original Filed April 22, 1933  24 Sheets-Sheet 18
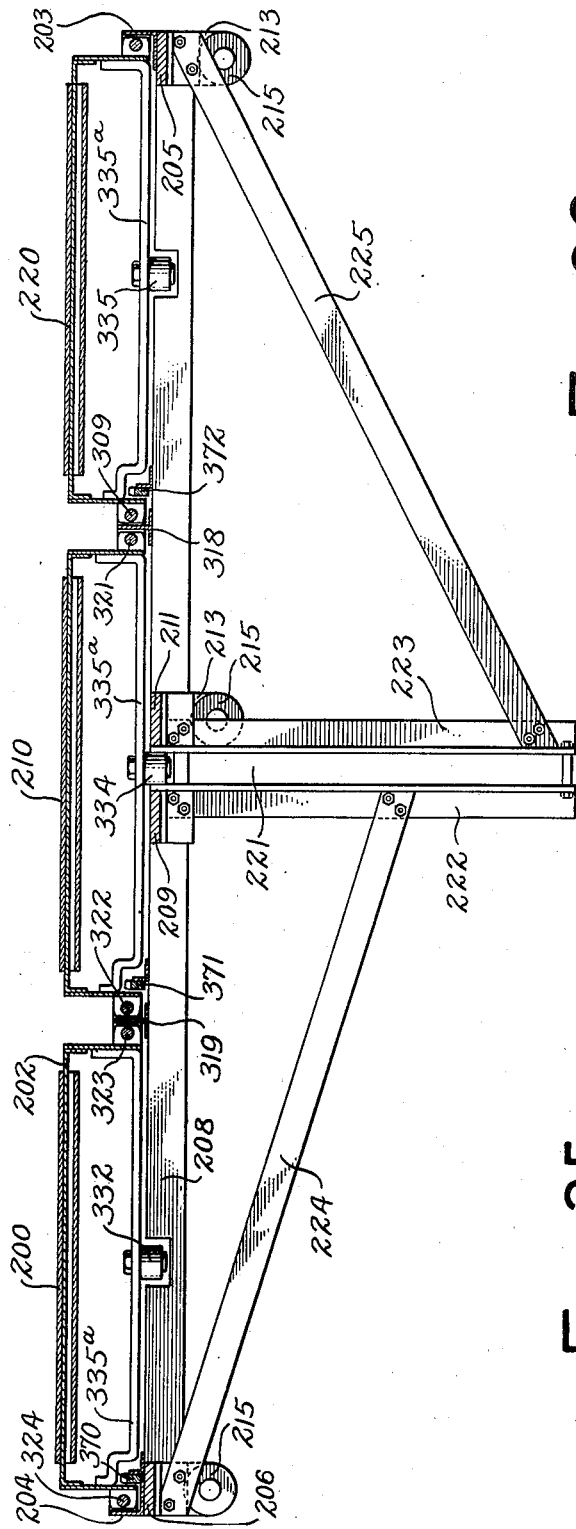
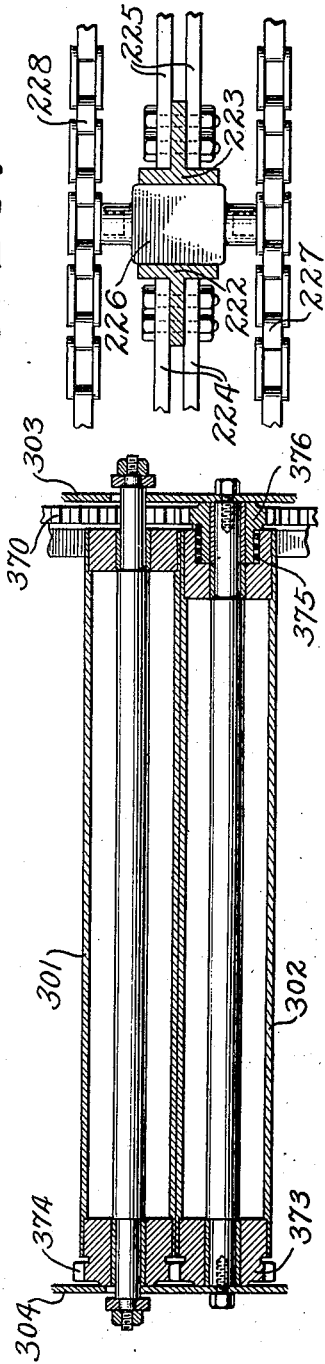
INVENTOR
Thomas L. Green
BY
ATTORNEY

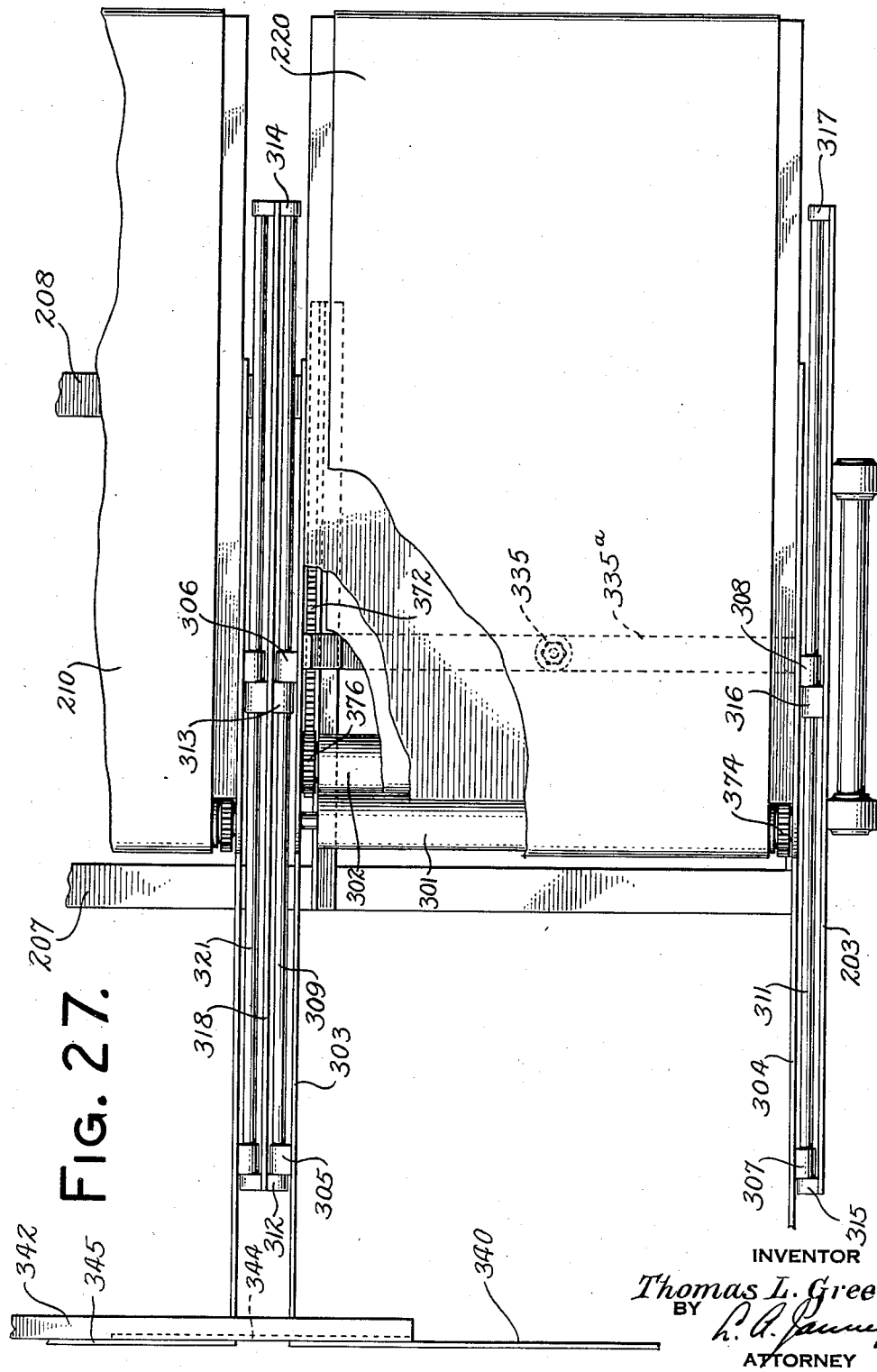

Dec. 27, 1938.   T. L. GREEN   2,141,859
APPARATUS FOR USE IN MANUFACTURING BISCUIT AND THE LIKE
Original Filed April 22, 1933   24 Sheets-Sheet 20

INVENTOR
Thomas L. Green
BY
ATTORNEY

Dec. 27, 1938.   T. L. GREEN   2,141,859
APPARATUS FOR USE IN MANUFACTURING BISCUIT AND THE LIKE
Original Filed April 22, 1933   24 Sheets-Sheet 22

INVENTOR
Thomas L. Green
BY
ATTORNEY

INVENTOR
Thomas L. Green
BY
ATTORNEY

Dec. 27, 1938.   T. L. GREEN   2,141,859
APPARATUS FOR USE IN MANUFACTURING BISCUIT AND THE LIKE
Original Filed April 22, 1933   24 Sheets-Sheet 24

INVENTOR
Thomas L. Green
BY
ATTORNEY

Patented Dec. 27, 1938

2,141,859

UNITED STATES PATENT OFFICE 2,141,859

APPARATUS FOR USE IN MANUFACTURING BISCUIT AND THE LIKE

Thomas L. Green, Indianapolis, Ind.; James W. Noel, executor of said Thomas L. Green, deceased Application April 22, 1933, Serial No. 667,391
Renewed May 17, 1938

23 Claims. (Cl. 107—7)

This invention relates to the high speed mass production of biscuit and equivalent articles by means of automatic machinery, and pertains more particularly to the coordination of biscuit-forming means, baking apparatus, and mechanism for automatically transporting biscuit from the forming means to and through the baking apparatus, so as to minimize the need to employ labor except to supervise the progress and regulation of the mechanical operations.

The invention serves various purposes of economy and efficiency as will appear to those skilled in the art.

An illustrative embodiment of the invention is shown in the accompanying drawings, in which:

Figure 1 is a diagrammatic side elevation of the principal operating units of the illustrative apparatus;

Figure 2 is a side elevation of the apparatus as it may be related with biscuit-forming and delivering mechanism (at the left of the figure) and with baking ovens (at the right of the figure);

Figure 3 is a plan view of the apparatus shown in Figure 2;

Figure 4 is an enlarged side section on a vertical plane indicated by the line 4—4 of Figure 3;

Figures 5 and 6 are enlarged detail side sections on a vertical plane indicated by the line 5—5 of Figure 3 showing certain parts in different positions of operation;

Figure 7 is a plan section on horizontal planes indicated by the line 7—7 of Figure 4;

Figure 9:
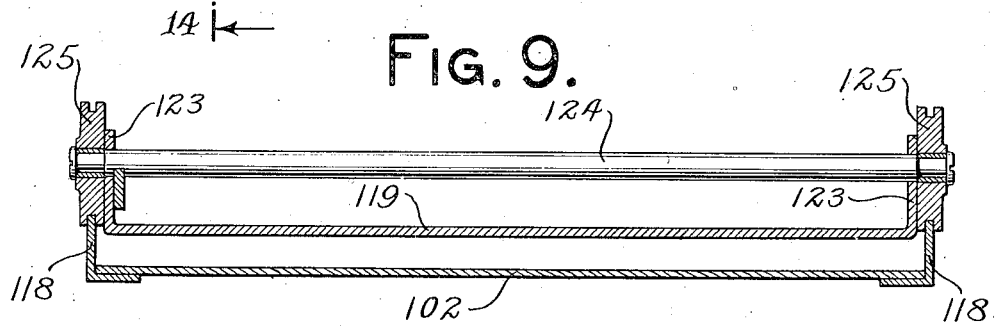
Figure 10:
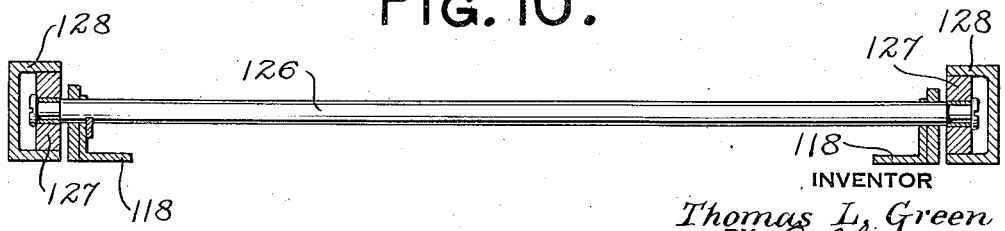
Figure 11:
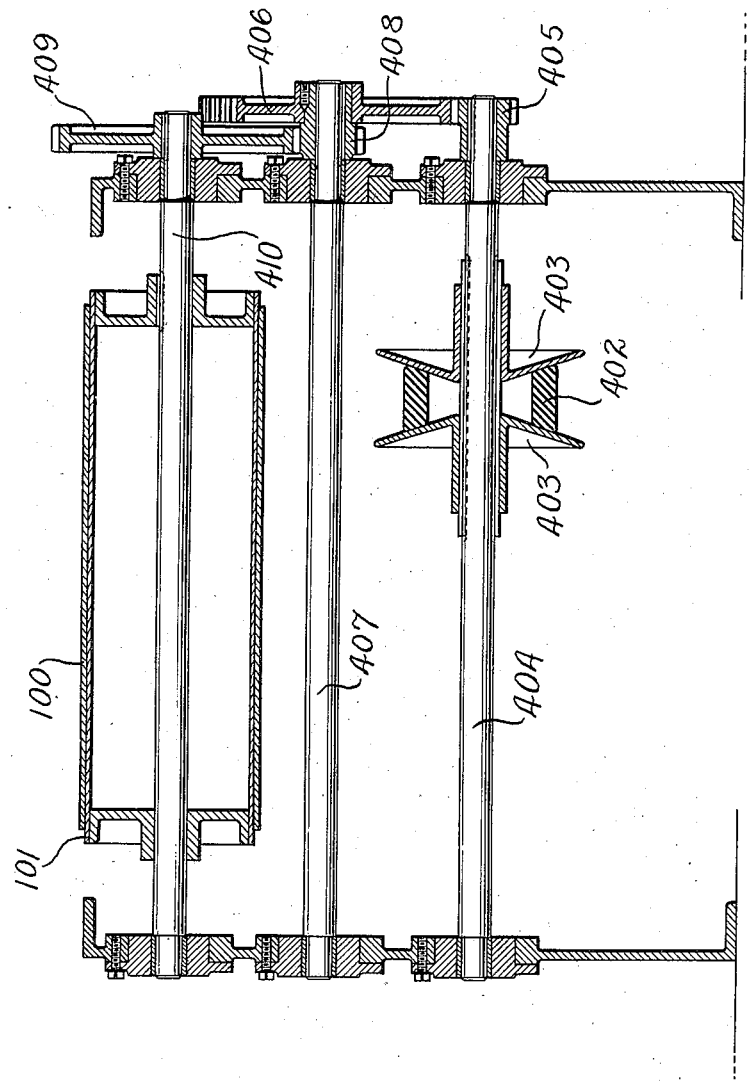
Figure 13:
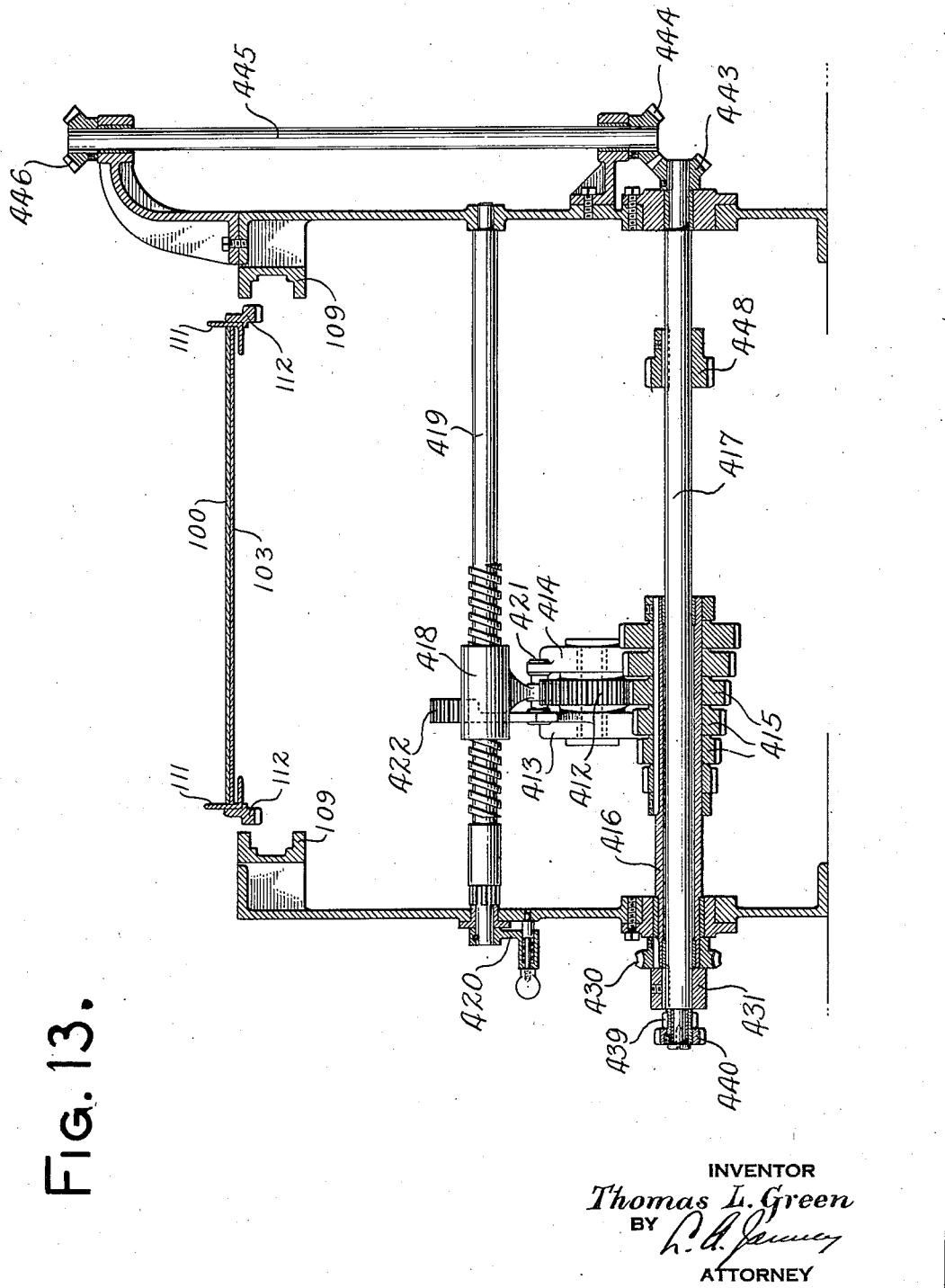
Figure 14:
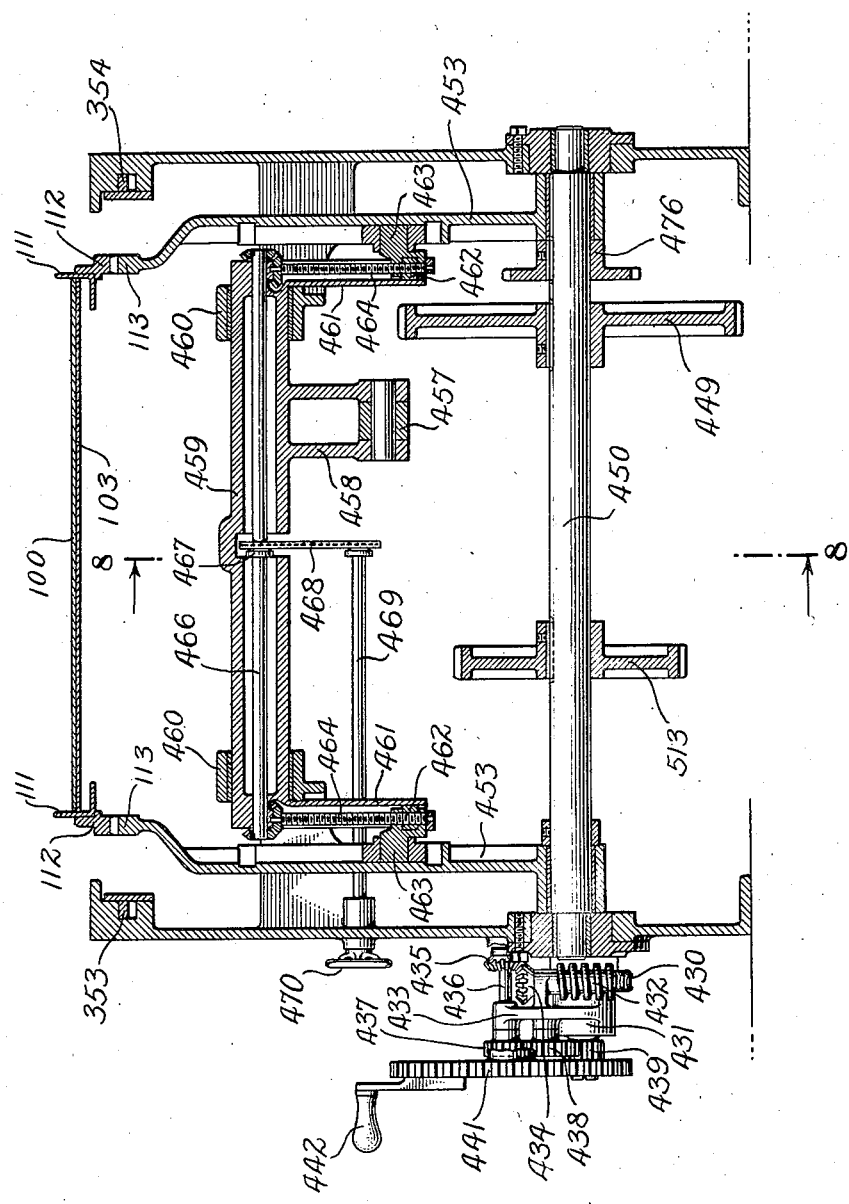
Figure 15:
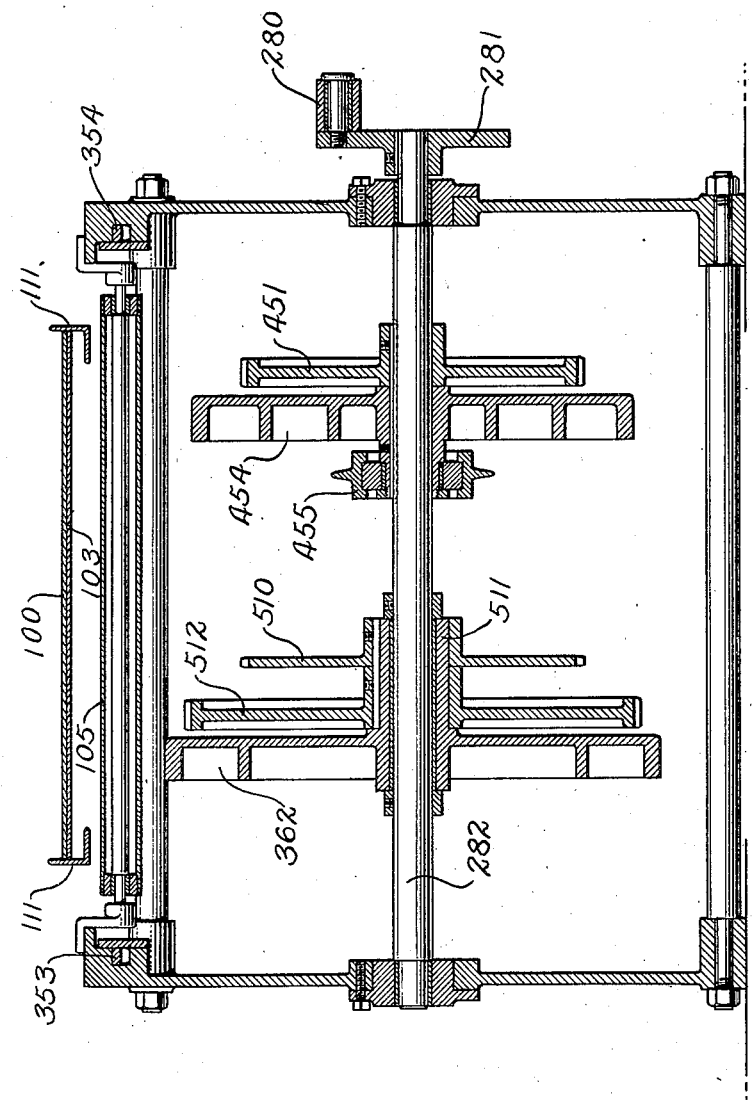
Figure 21:
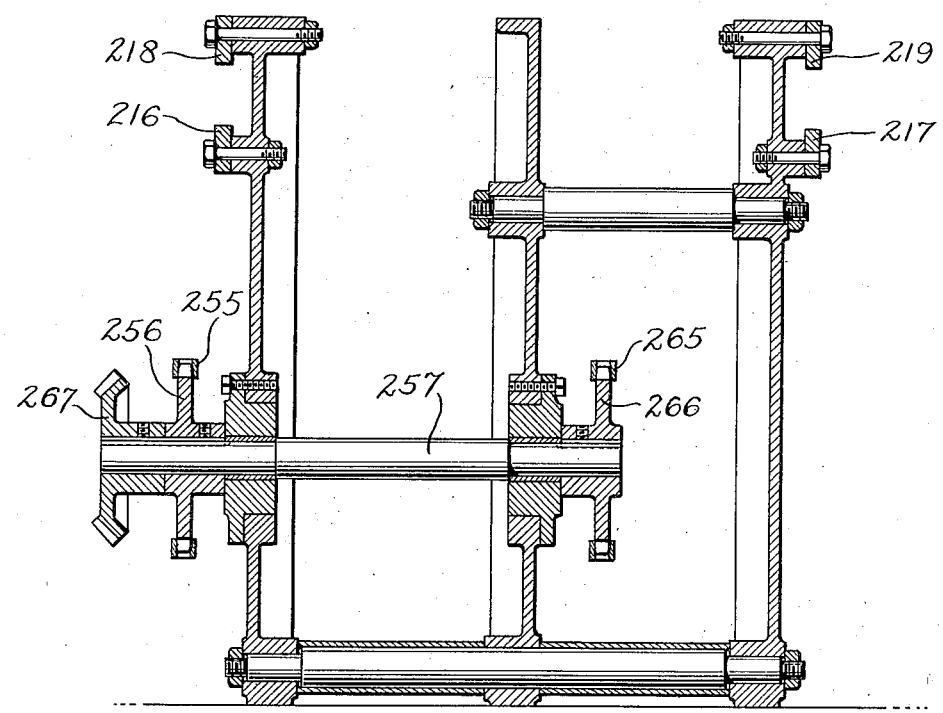
Figure 22:
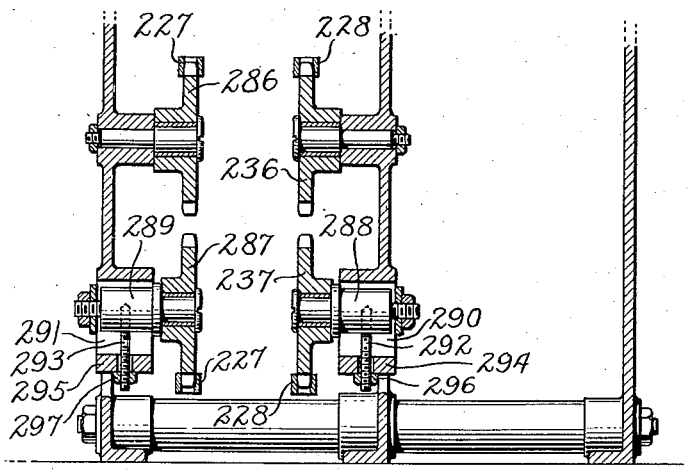
Figure 32:
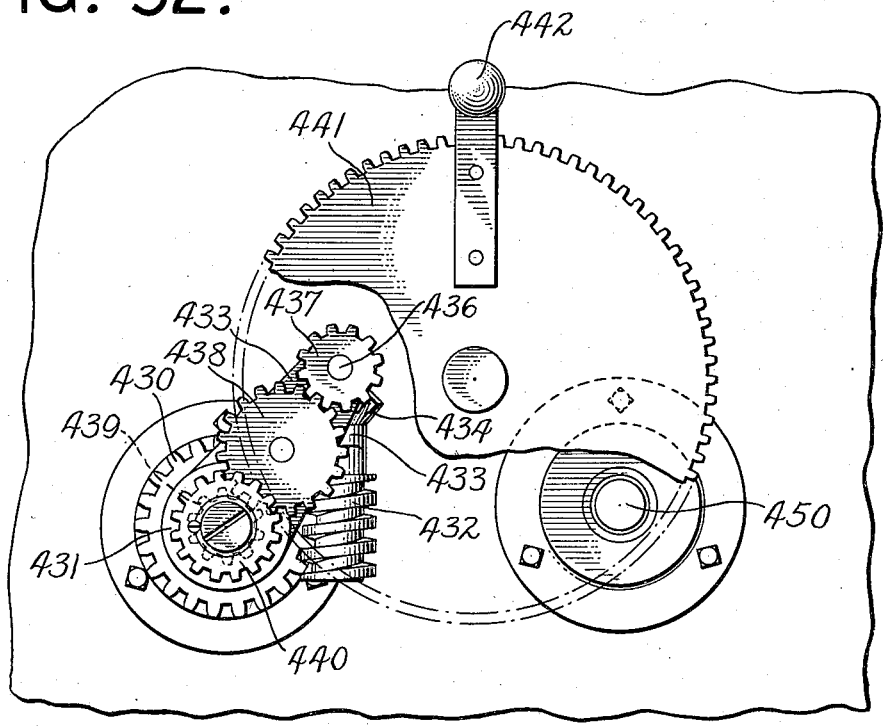
Figure 32A:
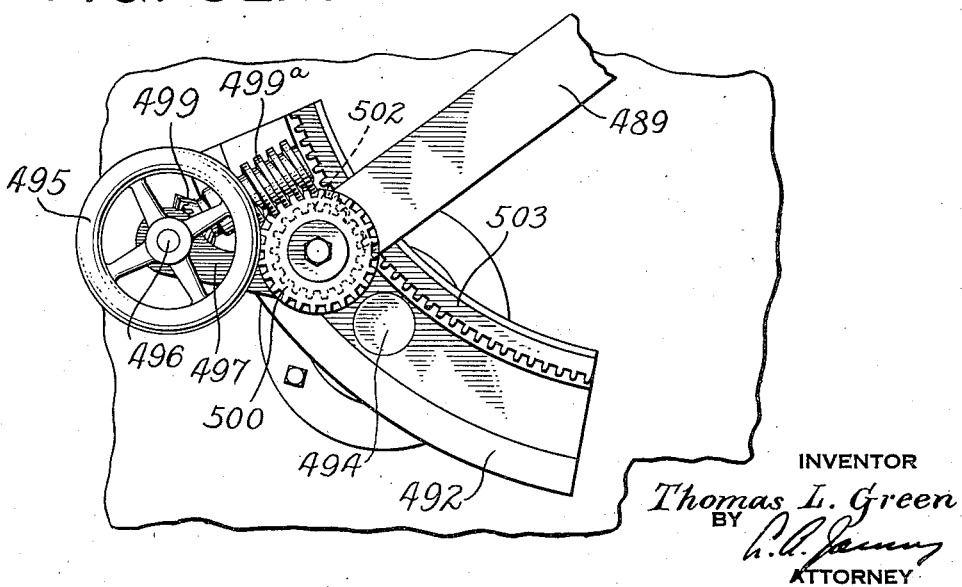

Figures 9 and 10 are detail transverse sections in respective vertical planes indicated by the lines 9—9 and 10—10 of Figure 2;

Figure 11 is a transverse section on a vertical plane indicated by the line 11—11 of Figure 2;

Figures 12 to 20, inclusive, are transverse sections on respective vertical planes indicated by the lines 12—12 to 20—20 inclusive of Figure 2;

Figure 16a (on the same sheet with Figure 16) is a detail side view of the parts shown in Figure 16, as viewed from left to right in Figure 16;

Figure 18a is a detached detail section on a vertical plane indicated by the line 18a—18a of Figure 18;

Figure 21 is a detail side section on vertical planes indicated by the line 21—21 of Figure 19;

Figure 22 is a detail side section on vertical planes indicated by the line 22—22 of Figure 19;

Figure 23 is a side section on vertical planes indicated by the line 23—23 of Figure 19;

Figure 24 is a detached view of the main transfer apron carriage, enlarged from the scale of the same parts shown in Figure 20, and viewed on the same plane as in Figure 20;

Figure 25 is a detail plan section on a substantially horizontal plane indicated by the line 25—25 of Figure 23;

Figure 26 is a detail horizontal section on the line 26—26 of Figure 20;

Figure 27 is an enlarged plan view of one of the transfer apron carriers of which three are shown on a lesser scale in plan view in Figure 3;

Figures 28, 29, 30 and 31 are diagrammatic plan views showing different stages of operation of three transfer apron carriers and related parts;

Figure 32 is a detail side elevation, on an enlarged scale, including the parts 440 and 441 shown at the lower left-hand part of Figure 2 and shown in vertical transverse section in Figures 13 and 14;

Figure 32a is a detail side elevation, on an enlarged scale, including the parts 492, 489, etc., shown in side elevation in Figure 2 and on transverse vertical planes in Figure 17; and Figures 33 to 40 inclusive are diagrammatic plan views corresponding somewhat to the diagrammatic side elevation shown in Figure 1, and illustrating a main delivery apron, three transfer aprons and four oven bands in different phases of relationship in the operation of the apparatus shown in the other figures.

The specific apparatus selected for illustration is diagrammed, in side elevation, in Figure 1 in which is shown the main delivery apron 100, a transfer apron 200 and an oven band 300. The main transfer apron 100 is in the form of an endless belt which passes around a driving drum 101 at one extremity of the upper run of the apron, and at its opposite extremity passes around a main delivery blade 102. Other drums are interposed in lower runs of the apron for purposes later explained. The upper run of the apron 100 is moved toward the right in the direction of the arrow in Figure 1 and biscuit are delivered from the apron 100 at the blade 102.

The transfer apron 200 passes over a drum 301; its upper run receives biscuit delivered from the main apron 100, and then in turn delivers them over a transfer blade 202 onto the oven band 300. A plurality of transfer aprons, like the apron 200, is provided; they are arranged for movement transversely of the machine (e. g. in a direction perpendicular to the plane of Figure 1) so that respective transfer aprons may be brought in desired sequence into the proper positions to receive biscuit from the main apron 100.

A plurality of oven bands is provided in the specific machine; and the transfer aprons are arranged to receive discharges of biscuit from the main apron 100, and then to deliver the biscuit to the respective oven bands.

The next following detailed description will be devoted first to the main apron 100 and its directly associated mechanism. As shown in Figures 3 and 4 the driving drum 101 is mounted on a fixed axis between the side frames of the machine. Thence the upper run of the apron 100 passes over a supporting plate 103 (Figures 5 and 13) and extends to the main delivery blade 102 (Figure 5). From the blade 102 a lower run of the belt passes beneath the blade 102 (Figure 5) and returns to pass around a drum 104 (Figures 1 and 4) which is mounted on a carriage for reciprocation parallel to the length of the apron 100. Thence the apron passes (toward the right in Figure 4) to a drum 105 mounted upon a fixed axis, and from there the apron returns to an idle drum 106 and to the driving drum 101. By mechanism presently described, the drum 101 is rotated, clockwise in Figure 4, so as to drive the apron 100 at uniform speed for any given operation. The speed of the drum 101, however, may be changed for purposes which will appear hereinafter.

The apron 100 receives formed biscuit, or it may be the dough apron of a biscuit-forming machine. For present purposes of illustration, it is unnecessary to show in the drawings or to describe the biscuit-forming contrivances because various known types thereof may be employed, for example in biscuit-cutting mechanism such as that disclosed in the patent to Thomas L. Green, No. 1,292,311, dated January 21, 1919, may be coordinated with the apron 100 as by having the mechanism of that patent deliver biscuit onto the apron 100, or by having the apron 100 formed as a continuation of the dough apron of said cutting mechanism. In any event, for the purposes of present description, it will be assumed that the upper run of the apron 100 transports biscuit in the form and arrangement which they have as a result of whatever biscuit-forming operation may be selected. While the specific machine of the present drawings is especially efficient in dealing with biscuit that are formed in so-called "peels", i. e., sheets of dough in which the individual biscuit or crackers have been demarked by the forming operation but without completely detaching the biscuit from each other, so that they occur as a sheet of connected biscuit or crackers,—nevertheless the invention is susceptible of advantageous use in connection with other forms or types of biscuit such as individual biscuit which are completely detached from the dough sheet by the forming operation.

The association of selected forming mechanism with the apron 100, and the operation of the latter, are preferably such that a continuous succession of biscuit, of whatever form, rest upon the upper run of the apron 100 and are moved thereon at continuous uniform speed toward the main delivery blade 102.

Figure 12:
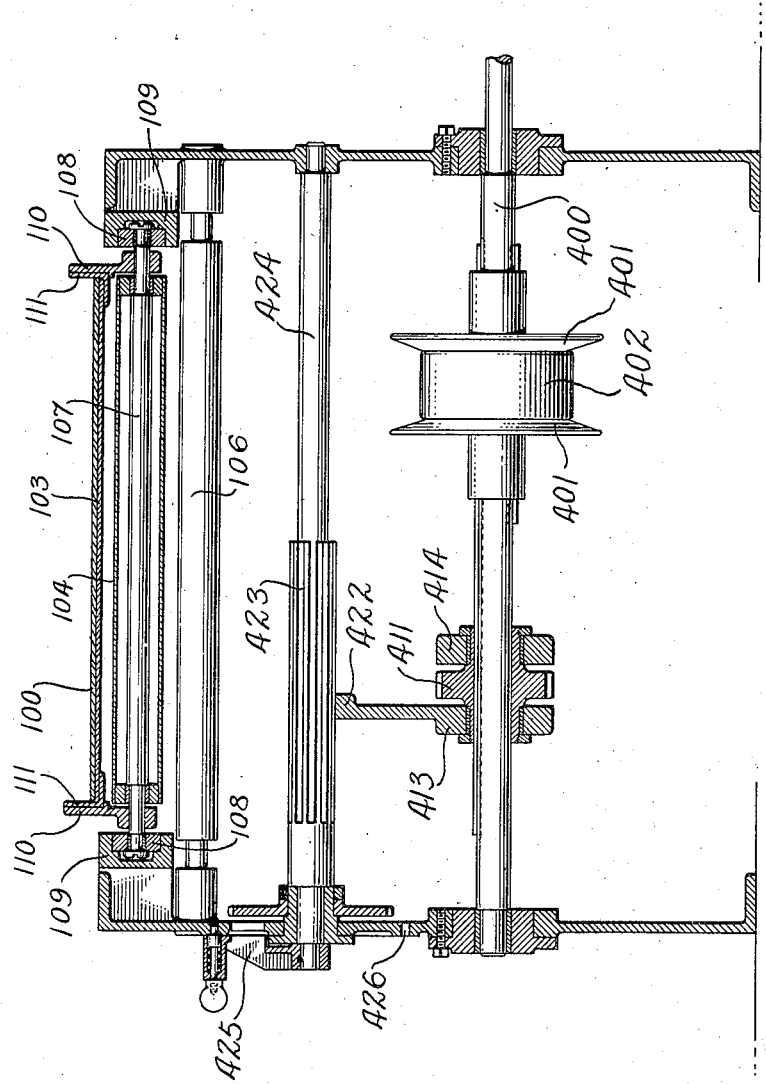

The blade 102 is mounted for reciprocation lengthwise of the apron 100. To suit this purpose, a reciprocating carriage is provided upon one end of which the delivery blade 102 is mounted, and upon the other end of which the drum 104 (Figure 4) is mounted. Thus the blade 102 and the drum 104 reciprocate together, while the drum 105 (Figure 4) remains upon a stationary axis, so that a take-up for the apron 100 is provided to accommodate the reciprocation of the delivery blade 102. The structure of the reciprocating carriage just referred to is indicated in Figure 12 which shows a vertical transverse section through the line 12—12 of Figure 4, i. e., through the vertical axial plane of the drum 104 at the rear extremity of the carriage. The drum 104, an idler, is mounted upon the shaft 107 on the ends of which are rollers 108, 108 that ride in grooves on the fixed frame members 109. Also supported by the shaft 107 are the brackets 110 for the opposite sides of the reciprocating carriage, and on those brackets are fixed the angle irons 111, 111 constituting the longitudinal bars of the carriage framework. Upon the horizontal flanges of the angles 111 rest the supporting plate 103 upon which rests the upper run of the apron 100. For clarity in the drawings, the turns of the apron 100 around the drums 104 and 106, are omitted from Figure 12.

Another cross section of the longitudinal carriage bars 111 is shown in Figure 13 on the vertical plane of the line 13—13 in Figure 4. This shows the supporting plate 103 and the angle pieces 111, and fixed to the latter the horizontal racks 112 through which the endwise reciprocation of the carriage is produced by the toothed segment 113 (Figure 4) which is operated as later described. Another cross section of the reciprocating carriage and connected mechanism is shown in Figure 14 which is on the vertical plane of the line 14—14 of Figure 4. There are shown sections of the segments 113, 113, at opposite sides of the machine, which engage the racks 112, 112 for reciprocating the carriage. The rear end of the carriage being supported by the rollers 108, 108 (Figure 12), from that point, the longitudinal frame members 111, 111, extend toward the right in Figure 4 to a point at which they are transfixed by a shaft 114 (Figure 18) upon the ends of which are mounted flanged rollers 115 that rest upon rails 116 on the machine frame. Figure 18 is a section of the vertical plane of the line 18—18 of Figure 2 where one of the rollers 115 is shown. The two rollers 115, 115 appear also in the plan view of Figure 3. In Figures 13 to 18 inclusive, it will be noted that the apron-supporting plate 103 inclines upwardly in relation to the longitudinal carriage members 111 and that the shaft 114 (Figure 18) is beneath the plate 103. From the point at which the carriage members 111 are supported by the rollers 115, the carriage extends toward the right in Figures 2, 5 and 6 to a joint 117 by which that part of the carriage already described is hinged to the forwardly projecting part of the carriage which supports the delivery blade 102. This forward end of the carriage is made up of longitudinal members 118 in the form of angle bars (Figure 19) which are simply hinged respectively, at the joint 117, to the corresponding angle bars 111, 111. Figure 19 is a section on the vertical plane of the line 19—19 of Figure 2, while Figure 20 is a similar section on the line 20—20 of Figure 2. In the latter figure, and in Figure 5, are shown an apron-supporting plate 119 carried upon upwardly projecting lugs 120, 120 transfixed by a shaft 121 carrying at its end grooved rollers 122, 122. At the other end of the plate 119 (Figure 5) are similar lugs 123 hung from a shaft 124 which carries rollers 125 (Figure 9, which is a section on the line 9—9 of Figure 2). The rollers 122 and 125 are grooved to rest upon the upstanding flanges of the angle pieces 118 which are longitudinal members of the forward end of the carriage. With this arrangement, the roller-supported plate 119 receives its support from the reciprocating carriage but is susceptible also of movement, on its rollers, lengthwise of the carriage for purposes presently explained. In the function of supporting the main apron 100, the plate 119 supplements the plate 103, which terminates just to the rear of the joint 117 (Figure 5). The delivery blade 102 is supported on the horizontal flanges of the angles 118, 118 (Figures 9 and 20). As shown in Figure 5, these angle members 118 extend toward the right and carry a shaft 126 (Figures 5 and 10) at the opposite ends of which are rollers 127, 127 which ride in the channels 128, 128 (Figures 2 and 10) which are pivoted at 129 (Figure 2) on a fixed part of the frame of the apparatus. When the channels 128, 128 are rocked upwardly on their pivots 129, they lift the rollers 127 (Figures 5, 6 and 10) and thereby rock the carriage members 118 upwardly upon the pivot supplied by the joint 117. This serves, at desired intervals, to lift the main delivery blade 102. The channels 128 are rocked upwardly for this purpose, by springs 130 (Figure 2) which are tension springs having fixed supports on stationary brackets 131, which springs pull against cams 132, 132 (Figures 2 and 3) engaging lugs 133 on the respective channels 128, 128. The cams 132, 132 are fixed upon a shaft 134 (Figure 3) mounted in stationary bearings, and the shaft carries a beveled gear 135 that meshes with the beveled gear 136 on a longitudinally extending shaft 137 through which the cams 132 are rotated so that the cams shall permit the springs 130, 130 to rock the channels 128 upwardly at proper times to lift the delivery blade 102, and thereafter the cams depress the channels 128, against the springs 130, to restore the deliver blade 102 to the lower extremity of its vertical movement.

The description thus far has shown the longitudinally reciprocating carriage which carries the delivery blade 102 and the take-up roll 104, and is jointed at the hinge 117 to permit the panner blade to be moved slightly upwardly and downwardly under the control of the cams 132.

At a later stage, the various mechanisms for moving the delivery apron 100, for reciprocating the delivery blade carriage, and for operating the cams 132 to elevate and lower the delivery blade 102, and the timed relationships between these movements, will be more fully described. For the present, it suffices to say the operation of delivering biscuit from the apron 100 at the delivery blade 102, begins when the blade 102 is at the extremity of its advance movement (toward the right in Figure 1), and occurs while the blade 102 is being retreated toward the left in Figure 1. During that movement, the forward travel of the apron 100 continues at uniform speed, and the blade 102 is at the lower extremity of its vertical movement so as to be in close proximity to the transfer apron 200 upon which the biscuit are to be deposited.

In some instances, in the described operation, the conditions shown in Figure 5 may occur. There the delivery blade 102 is shown at the extremity of its retreating movement (toward the left), having just completed one delivery cycle, and being in readiness to be advanced (toward the right) preparatory to another delivery cycle. At this juncture, it may happen that a biscuit 138 rests partly upon the main apron 100 but hangs somewhat over the edge of the delivery blade 102. Obviously, this biscuit 138 may be one of a transverse row, all of which occupy the same position indicated for the biscuit 138, or a similar position. It is desirable to withhold the row of biscuit 138 from delivery over the blade 102, for the time being, and not to deliver said biscuit as a part of the delivery cycle just completed, but to postpone delivery thereof to the next following cycle. Thus, the row of biscuit 138, instead of being delivered as the rearmost row of the batch of biscuit disposed on the transfer apron 200 as shown in Figure 5, is intended to become the foremost row of the next succeeding batch which is to be delivered during the next cycle.

Biscuit occupying some such position as that of the biscuit 138 might be crumpled or displaced by ensuing advance movement of the blade 102, if no provision were made for retaining the biscuit on the main apron 100. For thus retaining the biscuit, a detent device is provided to engage such portions of the biscuit as remain resting on the apron 100 and to hold them thereon against material displacement during advance movement of the delivery blade 102. A detent device for this purpose is illustrated by an elongated brush 139 (Figures 3, 5 and 6) which extends transversely of the main apron 100 in position to engage biscuit as shown in Figures 5 and 6. The brush is mounted upon brackets 140 projecting from the lugs 123 which support one end of the plate 119. The brackets 140 are preferably arc-shaped and the brush is secured thereto by a pin and slot arrangement, as illustrated, provided with a set screw, so that the brush may be adjusted to proper position to perform its biscuit-holding functions. Being carried on the lugs 123, the brush 139 is a part of the auxiliary carriage, so to speak, which comprises the apron-supporting plate 119 which is suspended from the rollers 122 and 125 (Figures 5 and 20); and that auxiliary carriage is movable lengthwise of the apron 100 in relation to the longitudinal angle members 118 of the delivery blade carriage. Because the apron 100 rests upon the plate 119, the advancing movement of the apron tends frictionally to move the plate 119, and therethrough the brush 139, toward the right in Figure 5, but movement in that direction is limited by lugs 141, 141 projecting from the angle members 118 in the track of the rollers 122 and 125 so as to limit the advance movement of the brush 139 in the direction of travel of the apron 100. Hence, when the delivery blade 102, and its carriage including the angle members 118, has been moved toward the right in Figure 5 (at a linear speed greater than that of the travel of the apron 100) the stops 141 will have been removed from in front of the rollers 122 and 125 so that the auxiliary carriage and the brush 139 are free to move forward with the apron 100. When, however, the delivery blade 102 is retreated (toward the left in Figure 5) and arrives at the extremity of the retreating movement, the lugs 141, 141 act as stops upon the rollers 122, 125 so as to predetermine the position of the brush 139, at that juncture, in relation to the blade 102, that relation being such as to hold the biscuit 138 in desired position on the apron 100.

Thereafter, when the delivery blade 102 is advanced toward the right in Figure 5 (at a linear speed greater than that of the apron 100), the lugs 141 are moved away from their stopping engagement with the rollers 122 and 125, and the auxiliary carriage is then free to be advanced by, and at the same speed as, the apron 100, due to the frictional engagement between the two. In this way, the brush 139 is maintained, for the time being, in fixed relationship to the adjacent surface of the apron 100, and to the biscuit 138 resting thereon, while the delivery blade 102 is thrust forward (as indicated in Figure 6) beneath the biscuit 138 which thereby receives support throughout its area upon the apron 100. Figure 6 shows the apparatus in the relative positions which they have at an intermediate stage during the advance of the blade 102, toward the right.

During this advance of the delivery blade 102 it is elevated above its delivery position, as controlled by the spring 130 and cam 132 (Figure 2), so as to remove the blade 102 and apron 100 from any contact or interference with the previously delivered biscuit that rest upon the transfer apron 200. This avoids any disturbance of the biscuit on the transfer apron during the shifting of the latter, which is later described.

As already said, Figure 5 shows the delivery blade 102 at the extremity of its retreating movement, toward the left, just following one delivery cycle which has deposited a batch of biscuit on the transfer apron 200. Thereafter the delivery blade 102 and its carriage are moved toward the right, through the intermediate position shown in Figure 6, until the delivery blade 102 stands in proximity to the right-hand end of another transfer apron which has been moved into position to receive a batch of biscuit which is to be deposited from the apron 100 during the next ensuing delivery cycle. In the meantime, the particular transfer apron 200, bearing its batch of delivered biscuit, has been moved transversely from beneath the blade 102 to make way for another transfer apron which is to receive the next batch of biscuit.

In the illustrative machine there are three transfer aprons which receive respective batches of biscuit delivered over the blade 102. Each transfer apron has a series of movements.

One transfer apron movement is that of reciprocation endwise, i. e., toward right and left in Figure 5. As there shown, the transfer apron 200 has been moving bodily toward the right while the delivery blade 102 has been moving toward the left so that the depositing of biscuit on the transfer apron is accomplished by the combined advance of the transfer apron and retreat of the delivery blade. At the start of a delivery cycle, the transfer apron 200 has been retreated until its blade 202 stands at approximately the point $x$ in Figure 5, while the delivery blade 102 has been advanced until it stands at approximately the point $y$ so that the blade 102 overlies the transfer apron 200 in proximity to the transfer blade 202. Thereupon the transfer apron is advanced so as to move its blade 202 from the point $x$ toward the right to the position shown in Figure 5 while the blade 102 is simultaneously retreated toward the left from the point $y$ to the position shown in Figure 5. At the same time, the uniform advance movement of the main apron 100 carries forward a batch of biscuit which are delivered over the blade 102 onto the transfer apron. It will be noted that the described advance movement of the blade 202, during one delivery cycle is substantially equal to the simultaneous retreating movement of the blade 102. For instance, in depositing a batch of biscuit which is substantially thirty inches in length (measured lengthwise the apron 100) the transfer apron will have been advanced bodily about fifteen inches while the delivery blade 102 will have been retreated about fifteen inches. On the completion of this delivery cycle, one complete batch of biscuit will rest on the transfer apron in readiness to be delivered eventually to an oven. To that end, the transfer apron, bearing its batch of biscuit, is moved transversely out of alignment with the main apron 100, while another transfer apron is moved into alignment with the main apron 100 to receive the next following batch of biscuit.

At this juncture, reference will be made to a series of diagrams illustrating a preferred character of movement for the several transfer aprons; and afterward the way in which the various movements are produced will be described.

Referring to Figures 33 to 40 inclusive: They show diagrammatically the main apron 100 and the delivery blade 102, the transfer aprons 200, 210 and 220, and four oven bands 300, 310, 320, 330. The operations, collectively, are such that successive batches of biscuit are delivered from the main apron 100 to respective transfer aprons 200, 210, 220, which in turn deliver the biscuit to the four oven bands.

Figure 33:
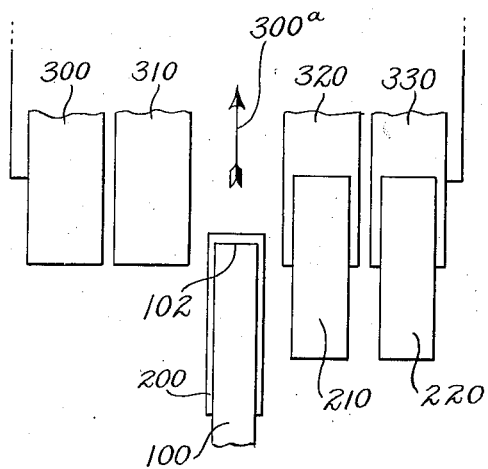

Figure 33 shows the main apron 100 and the transfer apron 200 in the position which they occupy just as a delivery cycle is about to begin. At the same time, two other transfer aprons 210 and 220 stand in alignment, respectively, with the oven bands 320 and 330 in readiness to deliver their respective batches of biscuit onto the oven bands. The oven bands are assumed to be moving in the direction of the arrow 300$a$ in Figure 33, at a relatively low speed, appropriate to the baking operation, as more fully described at a later point.

Figure 34:
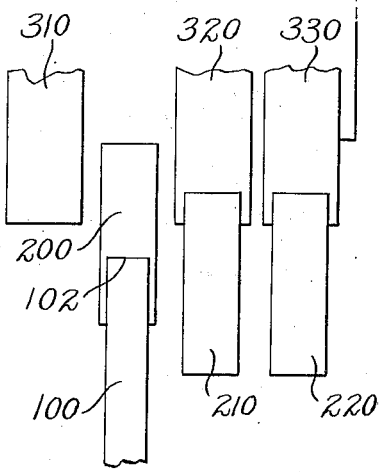

Starting with the parts in the positions indicated in Figure 33, the next ensuing movements bring the parts to the positions indicated in Figure 34. There the transfer apron 200 has been advanced and the delivery blade 102 has been retreated so as to deposit a batch of biscuit on the transfer apron 200. In the same interval, the transfer aprons 210 and 220 have been caused to deposit their batches of biscuit on the oven bands 320 and 330 (with details of operation later described). Hence, in Figure 34, the delivery apron 200 bears a batch of biscuit while the delivery aprons 210 and 220 are empty.

Figure 35:
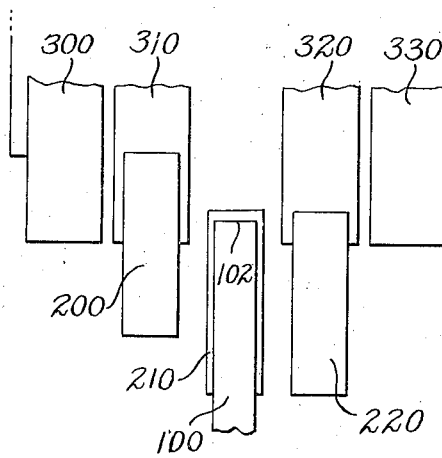

Following the stage illustrated in Figure 34, the next movements bring the parts to the positions shown in Figure 35. Here the loaded transfer apron 200 has been moved transversely out of alignment with the apron 100 and has been advanced. As it happens, in the particular organization, the loaded transfer apron 200 stands for the moment in alignment with the oven band 310; but it is not intended to deliver to that oven band 310 and hence it simply carries its load of biscuit idly for the time being.

In the same interval the transfer apron 210 has been moved into alignment with the main apron 100 and the delivery blade 102 has been advanced to position for beginning another delivery cycle. Also, the transfer apron 220 has been moved toward the apron 100. All of the oven bands continue their uniform travel. Now the loaded transfer apron 200 is temporarily idle; the transfer apron 210 is about to receive a batch of biscuit; the transfer apron 220 remains empty.

Figure 36:
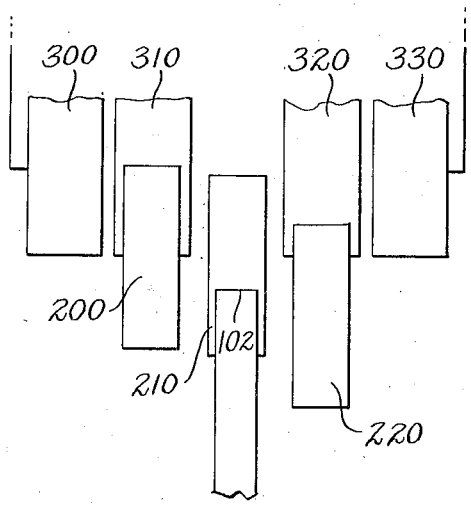

The next following movements bring the parts to the positions shown in Figure 36 wherein the transfer apron 210 has been advanced, the delivery blade 102 has been retreated, and both the delivery aprons 200 and 210 are now loaded with batches of biscuit while the transfer apron 220 remains still empty.

Figure 37:
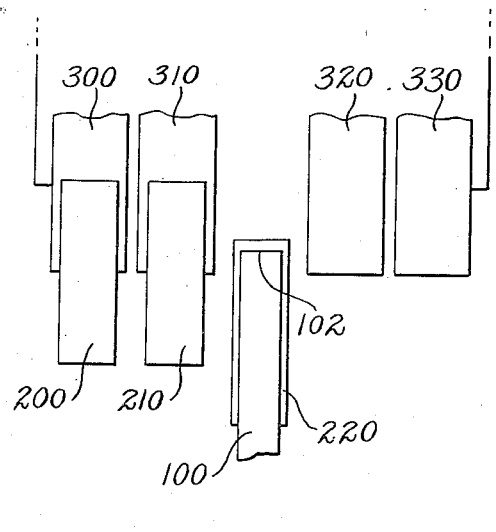

From the positions shown in Figure 36, the next movements bring about the relationships shown in Figure 37. Here the transfer aprons 200 and 210, both loaded, have been moved transversely until they are aligned respectively with the oven bands 300 and 310, and at the same time those transfer aprons stand in position to begin their delivery of biscuit to the oven bands. In the same interval, the empty transfer apron 220 has been moved into alignment with the apron 100 and the main delivery blade 102 has been advanced to position for beginning its deposit of biscuit.

Figure 38:
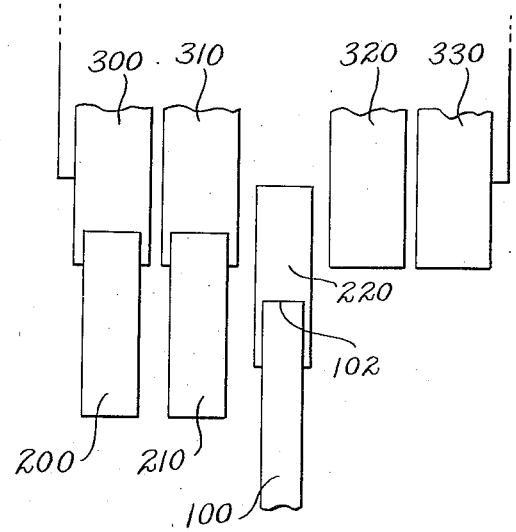

The next movement brings the parts into the positions shown in Figure 38 wherein transfer aprons 200 and 210 have delivered their batches of biscuit respectively to the oven bands 300 and 310, and therefore stand empty, while the transfer apron 220 has just received a batch of biscuit from the apron 100.

Figure 39:
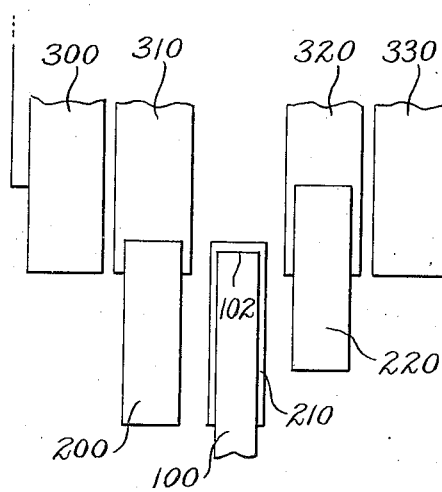

In the next movements the parts are brought to the position shown in Figure 39 in which the loaded transfer apron 220 idly carries its batch of biscuit for the time being. The empty transfer apron 210 has been brought into alignment with the apron 100, and the delivery blade 102 has been again advanced. The transfer apron 200 remains empty.

Figure 40:
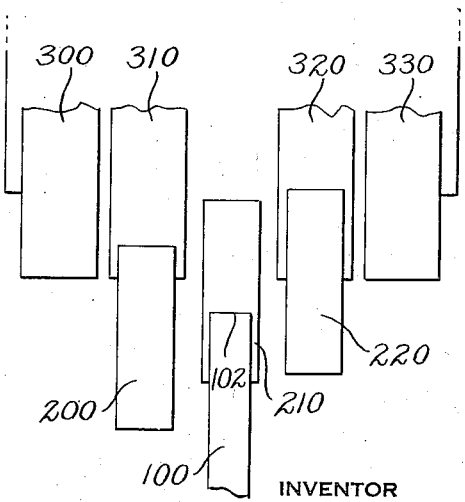

Next the parts are moved to the positions shown in Figure 40 in which the transfer apron 220 still idly carries its batch of biscuit; the transfer apron 210 has just received a new batch of biscuit; the transfer apron 200 remains empty.

The ensuing movements bring the parts again to the positions shown in Figure 33 as already described.

Through all the movements indicated in Figures 33 to 40, it will be noted that the three transfer aprons 200, 210, and 220 always retain the same transversely spaced relation to each other. That is to say, all three transfer aprons move transversely back and forth in unison because they are all mounted upon a common carriage which is reciprocated (toward left and right in Figures 33 to 40) in a series of steps of movement in each direction. Although the transfer aprons move collectively with their common carriage in transverse reciprocation, each transfer apron is so mounted on the carriage as to be capable of individual longitudinal reciprocation.

The transversely reciprocable carriage for the transfer aprons, is shown in side elevation in Figure 2; in side section in Figure 23; and in Figure 24, in end elevation as viewed from the left in Figure 23. The carriage has longitudinal frame members 203 (Figure 2) and 204 (Figure 24) which are angle irons fixed upon side bars 205, 206. The bars 205, 206 are connected by transverse frame members supplied by angle irons 207, 208. Thus the carriage has an oblong rectangular framework. Midway between the side bars 205, 206, the transverse frame members 207 and 208 are connected by additional longitudinal bars 209, 211 (Figure 24).

Depending flanges 212, 213 (Figures 2 and 23) on the bars 205, 206 and 211, are mounted on grooved rollers 214, 215 resting upon horizontal rails 216, 217 which are stationary on the main frame of the machine and extend across the machine to permit the necessary range of transverse reciprocation of the transfer aprons for the positions shown in Figues 33 to 40. Stationary guard rails 218, 219 engage the rollers 214 and 215 to keep them on their rails 216, 217.

As presently explained, the three transfer aprons 200, 210, 220 are mounted in fixed transverse relationship on the carriage 203, 204, 207, 208, and that carriage is rolled left and right in Figures 19, 20, and 24, on its rails 216 and 217. The means for thus reciprocating the carriage are next described.

Depending from the longitudinal bars 209, 211 of the transfer-apron carriage (Figure 24) is a slideway 221 between two vertical T-bars 222, 223 (Figure 26) which are fixed to and reciprocate horizontally with the carriage. The vertical bars 222, 223 are braced by struts 224, 225 mounted on the carriage. A slide-block 226 (Figures 20, 26) is reciprocated vertically in the slideway 221 and is also reciprocated horizontally to produce the transverse movements of the transfer-apron carriage.

As detailed in Figure 26, the slide-block 226 is pivotally mounted on and between parallel chains 227, 228 of which the chain 228 appears in elevation in Figure 20 passing round its sprockets 229, 231, 232, 233, 234, 235, 236, 237. Of these, the sprockets 233 and 234 are driving sprockets coupled with a source of power as later described. A second set of sprockets, exactly corresponding to those just enumerated, is provided for the chain 227 as indicated in the sectional view in Figure 23.

In the situation illustrated in Figure 20, the delivery apron carriage stands at the right-hand extremity of its transverse movement, and is about to start its movement toward the left. The chain 228 is driven in the direction of the arrow 238. Hence the block 226 is moved slightly upwardly from the position shown in Figure 20, and then horizontally toward the left, until it rounds the sprocket 232. During this fraction of its travel, the slide-block 226 moves the transfer apron carriage to the left so as to withdraw one transfer apron from beneath the main delivery apron 100, and to introduce the intermediate transfer apron beneath the main delivery apron. Thereafter the delivery apron carriage dwells at rest while the slide-block descends vertically past the sprocket 232 to the sprocket 234. During this dwell, a batch of biscuit is delivered to the intermediate transfer apron. Following that operation, the slide-block 226 moves horizontally from the sprocket 234 to the sprocket 236, propelling the transfer apron carriage another step toward the left to remove the intermediate transfer apron from beneath the main delivery apron 100 and to replace it thereunder by the third transfer apron. Thereupon another dwell occurs while the slide-block 226 moves vertically from the sprocket 236 to the sprocket 237, while the batch of biscuit is being delivered to the third transfer apron, then the slide-block moves horizontally from the sprocket 237 to the sprocket 235 to move the transfer apron carriage toward the right until the intermediate transfer apron stands again beneath the main delivery apron 100 during the dwell while the slide-block 226 moves upwardly from the sprocket 235 to the sprocket 233. Then the slide-block moves horizontally from the sprocket 233 to the sprocket 231 to return the parts to the position shown in Figure 20, after which another dwell occurs while the slide-block 226 moves upwardly from the sprocket 231 to the sprocket 229.

In other words, the relationships shown in Figure 20 are the same as those diagrammed in Figure 33; and the changes indicated in Figure 34 take place during the dwell while the slide-block 226 moves upwardly from the sprocket 231 to the sprocket 229. Thereafter the transverse movement of the transfer aprons to the positions shown in Figure 35 are caused by the horizontal travel of the slide-block 226 from the sprocket 229 to the sprocket 232. The next ensuing movements indicated in Figure 36 occur during the dwell while the slide-block 226 moves downwardly from the sprocket 232 to the sprocket 234.

Thereafter the further transverse movement of the transfer aprons to the positions shown in Figure 37 are caused by the horizontal movement of the slide-block 226 from the sprocket 234 to the sprocket 236. Following the next dwell permitting the changes indicated in Figure 38, the transfer aprons are returned, step by step, toward the right, as indicated in Figure 39 and finally in Figure 33.

Figure 23 is an enlarged detailed section on different vertical planes indicated by the staggered line 23—23 of Figure 19, and on like planes in Figure 20. In Figure 23 is shown the chain 228 and its sprocket 232, with the corresponding sprocket 242 for the chain 227. Likewise a sprocket 244 for the chain 227 corresponds with the sprocket 234 for the chain 228 and a sprocket 245 for the chain 227 corresponds to the sprocket 235 for the chain 228. Thus the sprockets for the respective chains 227 and 228 are arranged in pairs disposed as shown in Figure 20.

The chains 227 and 228 are both positively driven, each through two of its sprockets, the chain 228 being driven through its sprockets 233 and 234 as already said. Similarly the chain 227 is driven by its sprocket 244, mounted on the same axis with the sprocket 234, and by another sprocket corresponding to and mounted on the same axis with the sprocket 233. As shown in Figure 23 the sprocket 244 is fixed upon a shaft 250 upon which is also fixed a pinion 251 (see also Figure 19). The pinion 251 meshes with a gear 252 fixed upon the same shaft with a sprocket 253. Also meshing with the gear 251 is a second pinion 254 which is fixed upon the shaft of the second driving sprocket for the chain 227. A sprocket chain 255 connects the sprocket 253 with a sprocket 256 fixed on a shaft 257 (Figure 21).

Similarly the driving sprocket 234 for the chain 228 is fixed upon a shaft 260 with a pinion 261 meshing with a gear 262 fixed upon the same shaft with the sprocket 263. Also meshing with the gear 262 is a second pinion mounted on the shaft with the sprocket 233 (Figure 20). The sprocket 263 is connected by a chain 265 with a sprocket 266 (Figure 21) mounted on the shaft 257 which is driven through a bevel gear 267 fixed thereon. Thus there is a continuous transmission from the bevel gear 267 through the sprockets 256 and 266 (Figure 21) the chains 255 and 265, the sprockets 253, 263, the gears 252, 262, and the pairs of pinions driven thereby, including the pinions 254 for driving the chain 227, and another corresponding with the pinion 254 for driving the chain 228, and so on through the series of sprockets upon which are mounted the chains 227, 228, which carry between them the slide-block 226. With the described arrangement, the continuous rotation of the bevel gear 267 (Figure 21) is translated into the step by step transverse movement of the delivery apron carriage as it is reciprocated to present one after another of the transfer aprons beneath the main delivery apron 100 and also to register the transfer aprons with the respective oven bands.

The bevel gear 267 (Figure 21) meshes with a bevel gear 268 shown in the plan view in Figure 3; and this gear 268 is driven through a differential movement by which the chains 227 and 228 are driven at accelerated speed while the slide-block 226 is being moved horizontally, and at reduced speed while the slide-block 226 is being moved vertically. The result is to speed up the horizontal steps of movement of the transfer apron carriage, and to prolong the dwells during which the transfer apron carriage remains at rest to permit the transfer aprons to be loaded and to discharge their loads of biscuit.

The arrangement of the differential is illustrated in Figure 18, which is a section drawn on different vertical planes through the staggered line 18—18 of Figure 2. The lower part of the section of Figure 18 is on the vertical axial plane of the bevel gear 268 of Figure 3, and Figure 18 is viewed from right to left in Figures 2 and 3. The bevel gear 268 is fixed upon the shaft 269 upon which is also fixed a gear 270. The gear 270 meshes with a pinion 271 (Figure 18a) which in turn meshes in part with a pinion 272; and the pinion 272 in turn meshes with a gear 273 (Figure 18) which is fixed upon a sleeve 274 rotatably mounted on the shaft 269. A sprocket 275 is fixed upon the sleeve 274.

The two pinions 271 and 272, which mesh with each other, and which mesh respectively with the gears 270 and 273, are themselves mounted in the differential housing 276 which is rotatably mounted on the shaft 269 and the sleeve 274. Thus the differential housing 276 can be oscillated back and forth about the axis of the shaft 269 so as to oscillate also the pinions 271 and 272. When the differential housing 276 is oscillated in one direction, the effect is to accelerate the speed of the bevel gear 268 and therefore the speed of the chains 227 and 228 for transversely reciprocating the transfer apron carriage; while rocking the differential housing in the opposite direction reduces the speed of movement of the chains 227 and 228.

Reviewing the transmission from the sprocket 275 (Figure 18), it is mounted on and drives the sleeve 274 which drives the gear 273, which drives the pinion 272, which drives the pinion 271 (Figure 18a), which drives the gear 270 fixed upon the shaft 269, and thereby drives the bevel gear 268 which finally drives the bevel gear 267 (Figs. 3, 19 and 21).

The sprocket 275 (Figure 18) is driven by a chain 278 shown also in Figures 4 and 7 and presently described in more detail.

For the purpose of rocking the differential housing 276, the latter is connected by a link 280 (Figures 3, 7, 15, 18 and 18a) with a crank disk 281 mounted at one end of a shaft 282. The rotation of the disk 281 rocks the differential housing for the purposes already indicated, in a time relationship to the other operations which will be summarized at a later point. For the present, it suffices to say that the differential housing is so rocked as to accelerate the horizontal movements of the delivery apron carriage and to prolong the periods of rest of the carriage.

Figure 22 illustrates means for maintaining a proper tightness of the chains 227 and 228, Figure 22 being a section on the line 22—22 of Figure 19. As there shown, the sprocket 236 for the chain 228 and the corresponding sprocket 286 for the chain 227, are mounted on fixed axes while the sprockets 237 and 287 are mounted on vertically adjustable axes. For this purpose the shaft of each sprocket 237, 287 is mounted in a slide-block 288, 289 in a vertical slideway 290, 291. Fixed in each slide-block is a stem 292, 293, which projects downwardly through a flange 294, 295 supplied by a fixed part of the frame. At the lower end of each stem 292, 293 is threaded an adjusting nut 296, 297. When these nuts are turned up by wrenches, the corresponding stems 292, 293 are drawn downwardly with their slide-blocks 288, 289 and the sprockets 237, 287 so as to increase the tension on the chains 226, 227.

In order to steady the operation of the mechanism for transversely reciprocating the transfer apron carriage, and to check vibration of the driving chains 227, 228 which might impair the accurate start and stop of the movement, guide plates 299, 299 (Figure 20) are fixed upon the frame of the machine to overlie the vertical runs of the chains 227, 228. These plates serve to hold the adjacent runs of the chain against material vibration at the times of more or less abrupt changes in the speed of travel of the chains under the operation of the differential mechanism described above.

The mounting of the transfer aprons upon their transversely reciprocating carriage, just described, is shown in enlarged detail plan in Figure 27, in end elevation in Figure 24, and in side elevation in Figure 23. The transfer aprons are so mounted as to be reciprocable individually on their main carriage, lengthwise of the machine, i. e., in directions parallel to the advance movement of the main delivery apron 100. To suit this purpose each transfer apron is provided with its individual carriage which, for convenience, is called the "individual transfer apron carrier", to distinguish from the main transfer apron carriage which reciprocates transversely of the machine.

Each individual transfer apron carrier supports a transfer apron 200, 210 or 220 (Figure 24), the apron 200 being shown in side elevation in Figure 23. Each apron consists of an endless band of fabric or the like passing around a roll 301 and between the latter and another roll 302, the apron being engaged by the rolls 301 and 302 so that when they are rotated, at appropriate times, the upper run of the apron 200 (Figure 23) is caused to move linearly toward the right, as later described.

In Figure 27 the two transfer aprons 210 and 220 are illustrated; and typical rolls 301 and 302 are shown where the apron 220 is broken away. These rolls 302, 301 are revolubly mounted upon vertically disposed plates 303 and 304 constituting the sides of the individual carriers. Fixed to the plate 303 are slide-blocks 305 and 306; and fixed to the plate 304 are slide-blocks 307 and 308. These blocks 305, 306 are mounted upon and to slide lengthwise of a rod 309, while the blocks 307, 308 are mounted to slide on a rod 311. The rod 309 is supported at three points in lugs 312, 313 and 314, while the rod 311 is supported in corresponding lugs 315, 316 and 317. The three lugs 312, 313 and 314 are fixed upon one side of an inverted T-bar 318 (Figures 24 and 27). The lugs 315, 316 and 317 are fixed upon the angle iron 203. As already described at an earlier point, the angle iron 203 is one of the longitudinal frame members of the main transfer apron carriage, (see Figure 2) and is mounted upon cross frame members 207, 208 (Figures 2 and 24). The inverted T-bar 318 and a second inverted T-bar 319 and the angle-iron 204 (Figure 24) are likewise fixed upon and connect the cross frame members 207 and 208 of the main transfer apron carriage. Hence the rods 309, 311 for the transfer apron 220 and corresponding rods 321, 322 for the transfer apron 210, and rods 323, 324 for the transfer apron 200 are fixed upon the main transfer apron carriage and partake of the transverse reciprocation. At the same time, each individual transfer apron carrier is mounted upon its pair of rods,—e. g., 309, 311,—so as to be slidable axially on said rods. As shown in Figure 27, the transfer apron carrier is at the extreme position of retreat in its longitudinal movement, toward the left in Figure 27, which is toward the left in Figures 2 and 23. In that position, ears 305, 307 on the transfer apron carrier stand near the lugs 312 and 315 which are fixed on the main transfer apron carriage. From that relationship, the individual transfer apron carrier may be advanced toward the right in Figure 27 and in Figures 2 and 23, moving the ears 305, 307 on the transfer apron carrier toward the lugs 313, 316 fixed on the main transfer apron carriage.

By reference to Figures 5 and 6, it has been explained that the transfer apron 200 is advanced toward the right, while the delivery blade 102 is retreated toward the left, to perform the operation of delivering biscuit from the main delivery apron 100 to the transfer apron 200. This advance movement of the transfer apron, during a delivery cycle, is effected by the means next explained.

As shown in Figure 27, the longitudinal frame pieces 303 and 304 of an individual transfer apron carrier are connected at their ends by a cross piece 340. A similar cross piece is provided for each of the other two individual transfer apron carriers as indicated by the cross piece 345 in Figure 27. One of these cross pieces is shown at 325 in Figure 5. When any one of the transfer aprons is in alignment with the main delivery apron 100, preparatory to or during a biscuit delivery cycle, the corresponding cross piece 325 or 340 or 345 stands in the path of a pusher (e. g. 327, Figure 5) mounted on a sprocket chain 328 on a sprocket 329. As shown in Figure 7, the chain 328 encircles another sprocket 471 through which the chain is driven as presently described. Figure 5 shows the parts at approximately the extremity of the advance movement (toward the right) of the individual transfer apron carrier. The pusher 327 has propelled the frame members 303 and the carrier from the position of extreme retreat indicated in Figure 27, during a depositing cycle in which the transfer apron 200 receives a load of biscuit. Presently, from the position shown in Figure 5, the pusher 327 will have completed its forward movement with its chain 328 and will then travel on the lower run of the chain 328 rearwardly until it passes around the sprocket 471 (Figure 7) and then resumes its position on the upper run of the chain 328 preparatory to another advance pushing operation. In the specific machine three of the pushers, like the pusher 327, are provided on the chain 328, and they are disposed equidistantly on the chain so that about one-third of the total length of the chain lies between each pusher and the next. One of the pushers is shown at 327a in Figure 4 in the position which it occupies while the pusher 327 stands as shown in Figure 5. At the same time the third pusher (not shown) on the chain 328 would stand at the then lower run of the chain, about midway between the shaft 329a and the shaft 473.

The total length of the chain 328 is approximately three times the circumference of the driving sprocket 471 (Figure 4). Hence, for each revolution of the sprocket 471, the upper run of the chain 328 is advanced through one-third of the total length of the chain thereby moving one or another of the pushers from the position of the pusher 327a in Figure 4 to the position of the pusher 327 in Figure 5. As more fully explained at a later point, each complete revolution of the driving sprocket 471 occurs during one complete cycle of horizontal reciprocation of the main delivery blade 102. Hence the pushers on the chain 326 are advanced, in succession, in the upper run of the chain, each advance thereof serving to move forward a transfer apron carrier during retreat of the main blade 102 while depositing a batch of biscuit, and thereafter also to move the transfer apron carrier still farther forward during the ensuing advance of the main blade 102.

When the pusher 327 has completed one of its movements to advance a transfer apron carrier, it then leaves the latter in substantially the position shown in Figure 5 wherein the transfer apron is loaded with a batch of biscuit. At that juncture, the main transfer apron carriage is moved transversely to withdraw the transfer apron 200, and its carrier, from alignment with the main delivery apron 100, and to present another delivery apron and its carrier beneath the main delivery blade 102. The initial advance of the carrier for the transfer apron 200, by the pusher 327, begins when the parts are in the relationships shown in Figure 33. The completion of the advance of that carrier leaves the transfer apron 200 in the position shown in Figure 34. Thereafter the transverse movement of the main transfer apron carriage moves the transfer apron 200 to the alignment indicated in Figure 35.

During this transverse movement of the transfer apron 200, its carrier is given a further movement of advance beyond the point of advance shown in Figure 34, to that shown in Figure 35.

This second advance step of the individual transfer apron carrier is caused by a stationary cam against which a roller, mounted on the transfer apron carrier, is pushed during the transverse movement of the main transfer apron carriage. As shown in Figures 28, 29, 30 and 31, each individual transfer apron carrier has thereon a roller 332 or 334 or 335. A typical example of the mounting of one of these rollers is shown in Figure 23 wherein the roller 334 is shown depending from a cross piece 334a mounted between the side frame members corresponding to 303 and 304 in Figure 27 which shows also the roller 335 for the transfer apron 220.

Mounted upon the stationary frame of the machine in the position shown in Figure 3 is a cam block 336 and also a cam block 337, the latter being shown also in Figure 2.

Figure 28:
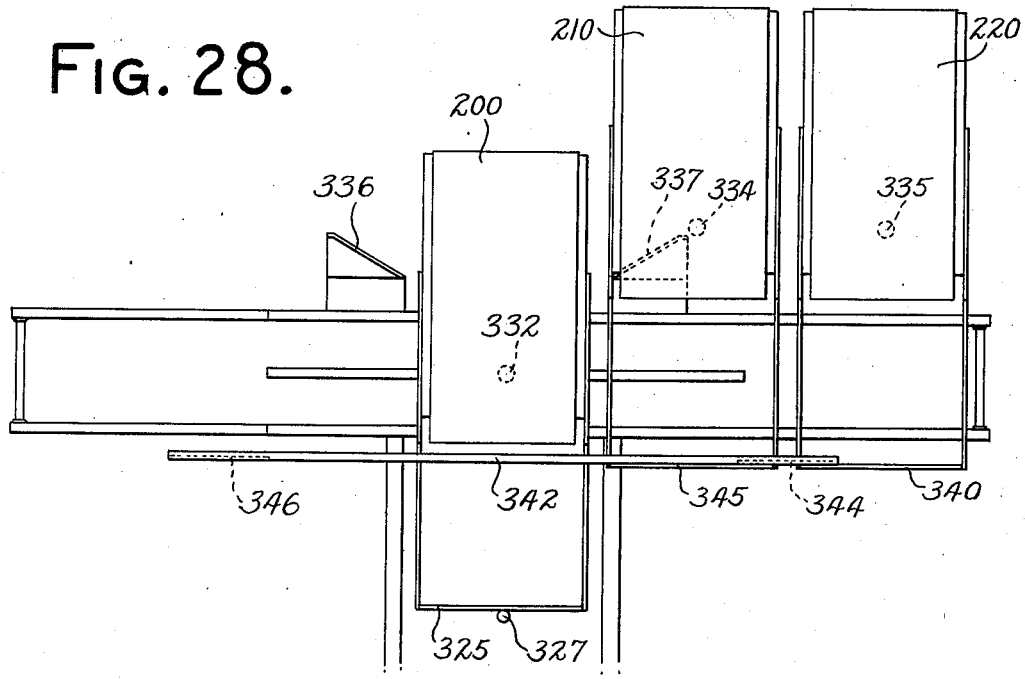

Referring to Figure 28, the three transfer aprons and their individual carriers are shown in the same relations which they have in Figure 33. At this stage a delivery cycle is about to begin for the purpose of loading the transfer apron 200. The pusher 327 is about to start the advance movement of the transfer apron 200 (toward the top of the sheet in Figure 28). The transfer aprons 210 and 220 stand as shown.

Figure 29:
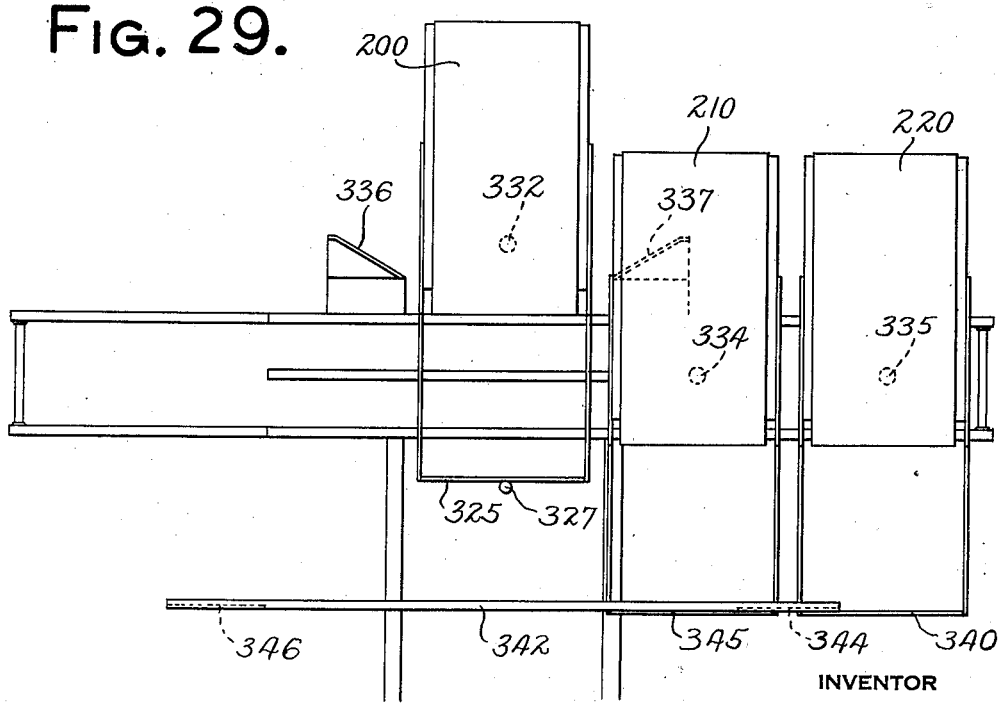
Figure 30:
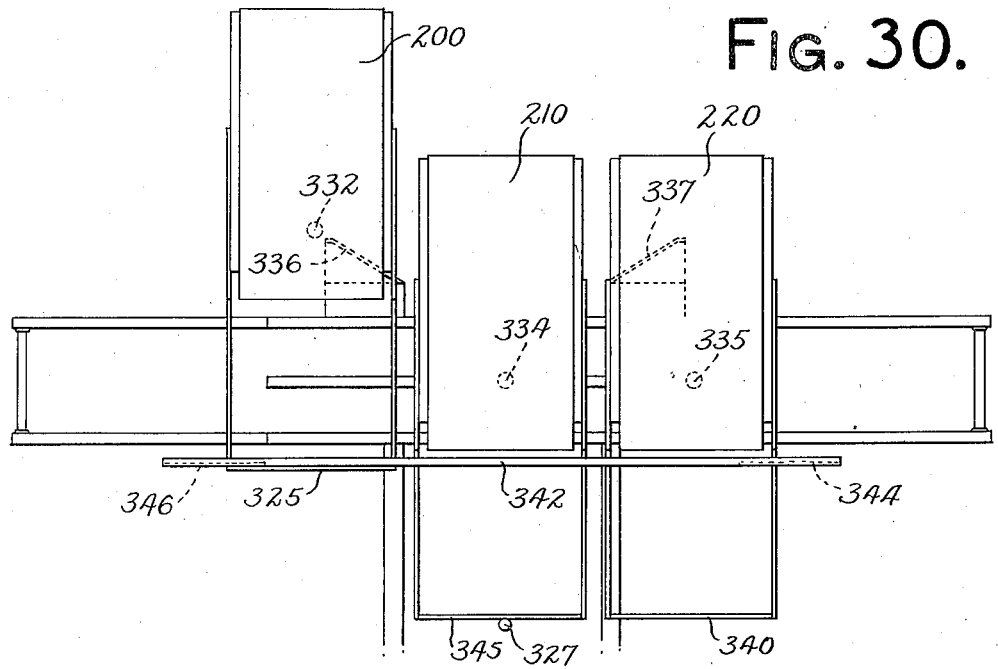
Figure 31:
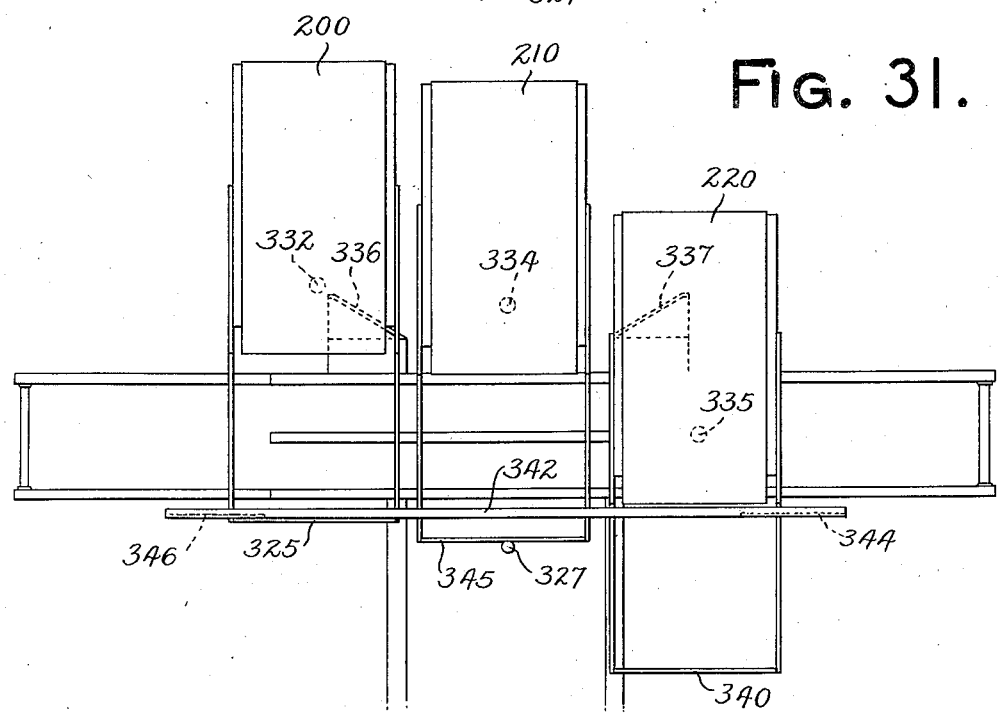

When the pusher 327 has completed its advance movement, the transfer apron 200 stands as shown in Figure 29. In the meantime, the carriers for the transfer aprons 210 and 220 have been retreated to the position shown in Figure 29, but this movement will be ignored for the present. In the advance of the carrier for the apron 200, the roller 332 will have been moved to the position shown in Figure 29 into transverse alignment with a part of the cam 336. Hence, when the parts are moved to the position shown in Figure 30, by the transverse movement of the main delivery apron carriage, the roller 332, being moved toward the left, will contact the cam 336 and will cause the carrier for the apron 200 to be advanced a short additional step until it takes the position shown in Figure 30. In the meantime, the carrier for the apron 210 will have been brought into alignment with a pusher 327 (Figure 30), and then the pusher 327 will advance the carrier for the apron 210 to the position shown in Figure 31 after which the next transverse movement of the main transfer apron carriage, toward the left, will advance the apron 210 slightly farther until it is transversely aligned with the apron 200, when the parts will stand in the positions indicated in Figure 37.

Returning to Figure 28, the parts are shown just after the main transfer apron carriage has been moved to the right-hand extremity of its transverse movement, with the effect of causing the roller 334 on the carrier for the transfer apron 210 to contact the stationary cam 337 and advance the apron 210. A similar advancing of the apron 220 and its carrier had been caused by the roller 335 contacting with the cam 337, in the next preceding step of transverse movement, toward the right, of the main transfer apron carriage. With the described arrangement, the cooperation from time to time of the respective rollers 332, 334 and 335, with the cams 336 and 337, has the effect of producing for each transfer apron carrier a final step of advance movement to present the carrier always at the same predetermined extremity of advance movement, so that, when a transfer apron is in readiness to deliver biscuit to an oven band, it will always have the same positional relation to the oven band. The peak of each cam 336, 337 determines the extreme advance position of each transfer apron carrier, so that those extreme advance positions are always the same. Thus, the cams 336 and 337 produce final steps of advance movement of the transfer apron carriers, for the purposes explained, independently of their preceding advance movements, and regardless of the speed at which the transfer apron carrier is advanced while receiving biscuit, and regardless of the particular position which a carrier may have reached when its transverse movement removes it from contact with the pusher 327. The purpose and effect of dividing the advance movements of the transfer apron carriers into the two described steps, will be more evident at a later point in the discussion of the sequence of operations in the illustrative apparatus.

As thus far explained, each transfer apron carrier is advanced through two steps of longitudinal movement, the first caused by a pusher 327 during deposit of a batch of biscuit on a transfer apron; and the second which occurs during the transverse movement of a transfer apron after it has received a batch of biscuit, this second step being produced by cooperation of one of the rollers 332, 334, 335 with one or the other of the cams 336 or 337. In each instance, after a transfer apron carrier, loaded with a batch of biscuit, has been advanced to the farthest extremity of its movement, it requires eventually to be retreated again preparatory to a repetition of its advance movement, and during its retreating movement it is caused to deliver its batch of biscuit to an oven band.

In the operation of the specific machine illustrated in the drawings, the delivery of biscuit to the oven band is performed by two transfer aprons acting simultaneously. For instance, Figures 33 shows the two transfer aprons 210 and 220 just as they are about to begin the deposit of biscuit upon the respective oven bands 320, 330. Figure 37 shows the two transfer aprons 200 and 210 as they are about to begin depositing biscuit on the oven bands 300 and 310. With this mode of operation it is convenient to retreat the transfer aprons two at a time, simultaneously, as by retreating the aprons 210, 220 together from the positions shown in Figure 33 to those shown in Figure 34; and to retreat the two aprons 200 and 210 together from the positions shown in Figure 37 to those shown in Figure 38. This retreating movement of the individual transfer apron carriers is brought about by pushing the cross bars 325 (Figure 5) of the appropriate carriers toward the left in Figure 5. In other words, the respective cross bars, like the cross bar 325 (Figure 5), are acted upon at one time (by the pusher 327) for advancing the carriers, and at another time, (by a retreating means) in the opposite direction, for retreating the carriers. This retreating movement is best illustrated by the mechanism shown in Figures 2, 3, 16 and 18.

Referring to Figure 2, one of the rear cross bars 340 is shown on a corresponding frame member 341 of an individual transfer apron carrier. The cross bar 340 and the frame member 341 of Figure 2 correspond to the cross bar 325 and frame member 303 of Figure 5, but they pertain to different individual carriers since, as indicated in Figure 3 the cross bar 340 and the frame member 341 pertain to the lowermost transfer apron carrier in that figure while the cross bar 325 shown in dotted lines in Figure 3 lies beneath the main delivery apron 100, and pertains to the transfer apron carrier for the transfer apron 200 which is then receiving a batch of biscuit. The pusher 327 is indicated by dotted lines in Figure 3 in its operation of pushing (towards the right) the cross bar 325 to advance the carrier for the transfer apron 200 during the deposit of biscuit from the main delivery apron 100.

In Figures 2 and 3, the cross bar 340 is shown engaged by a retreating pusher bar 342 which is an elongated bar extending transversely of the machine as shown in Figure 2. Near its opposite ends, but not in its middle portion, the bar 342 has depending flanges which are indicated by the angle iron construction, in end view, shown in Figure 2. This construction is more clearly illustrated in Figure 18 which is a section on the staggered line 18—18 of Figure 2 as it would be viewed from right to left in Figures 2 and 3. That is to say, the lowermost cross piece 340 in Figure 3, appears at the extreme left of Figure 18 where it is engaged by the depending flange 344 of the retreating pusher bar 342. This depending flange 344 engages not only the cross bar 340 for the carrier of the transfer apron 220, but also the cross bar 345 pertaining to the carrier for the transfer apron 210.

At the end of the retreating pusher 342 opposite to the depending flange 344 is another depending flange 346 which is indicated in Figure 3 but which is broken away in Figure 18. This arrangement of the depending flanges 344 and 346 on the retreating pusher bar 342, is such that the flange 344 will engage the cross pieces 340 and 345 when the carriers for the transfer aprons 210 and 220 occupy the positions shown in Figure 28, while the depending flange 346 will engage the cross bars 325 and 345 when the main transfer apron carriage stands at the extremity of its movement toward the left in Figures 28 to 31 inclusive. The relationships of the parts while the depending flange 346 engages the cross bars 325 and 345, is indicated in Figure 37.

It will be noted in Figure 18 that the retreating pusher 342 at its middle portion is in the form simply of a flat plate having no depending flange and therefore having no engagement with the particular cross bar 325 which then stands with its transfer apron in biscuit receiving position beneath the main delivery apron. Hence, the retreating pusher 342 has no effect upon any individual transfer apron carrier while it remains in alignment with the main delivery apron 100. Hence, each carrier, when so aligned, is free to be advanced by the action of an advance pusher 327 as already described.

To perform its function of retreating individual transfer apron carriers, the retreating pusher 342 is horizontally reciprocated. For this purpose, the pusher 342 is secured to slide-blocks 347, 348 (Figure 18) supported respectively by studs 349, 350 arranged to slide horizontally in slots 351, 352 in a stationary part of the machine frame. Extending rearwardly from the slide-blocks 347, 348, i. e., to the left in Figure 2, are rack bars 353, 354 shown in Figures 14, 15 and 16. The rack bars 353, 354 are rigidly secured to the slide-blocks 347 and 348, respectively, and the rack bars are mounted, with depending teeth, to slide horizontally in ways in the machine frame. As shown in Figure 16, the rack bars 353, 354 are engaged respectively by gears 355, 356 both fixed upon a shaft 357 which (for purposes of adjustment later explained) is driven through a differential mechanism that takes its drive through a pinion 358 sleeved on shaft 357. The arrangement of these parts is indicated in side elevation in Figure 4, showing the rack bar 354 engaging the gear 356 fixed on the shaft 357 upon which is sleeved the pinion 358 which (through the differential) drives the shaft 357. As shown in Figures 4 and 16, this pinion 358 is engaged by a segmental gear 359 having its pivot upon a shaft 360 and equipped with a cam roller 361 engaged in a path cam 362. This cam oscillates the segmental gear 359 and therethrough rotates the pinion 358 which, through the differential, drives the shaft 357 and its gears 355, 356, and thereby reciprocates the retreating pusher 342 with continuous repetition throughout the operation of the machine. Thus the depending pusher flanges 344 and 346 on the retreating pusher 342 are horizontally reciprocated at regular intervals so that when any of the cross bars 325, 340 or 345 happen to be interposed in the retreating path of one of the flanges 344, 346, the corresponding individual transfer apron carriers will be retreated.

The differential interposed between the pinion 358 and shaft 357 serves purposes of adjustment and coordination which may be more readily understood at a later point in this description.

When the parts are in the positions shown in Figure 4, the racks 354, 353 and the retreating pusher 342 stand at the extremity of their retreating movement, toward the left in Figures 2, 3, and 4; and at such time the appropriately engaged individual transfer apron carriers will have been correspondingly retreated. In the further movement of the cam 362 (clockwise in Figure 4) the retreating pusher 342 will be moved toward the right, idly, throughout approximately one-quarter of a revolution of the cam, and at the juncture the retreating pusher 342 will have reached the extremity of its advance movement at which it dwells at rest through approximately the ensuing one-half revolution of the cam 362 until the retreating movement is begun and completed in approximately the final one-quarter revolution of the cam. During the somewhat prolonged dwell of the retreating pusher 342 at the extremity of this advance movement toward the right in Figures 2, 3 and 4, opportunity is afforded for the appropriate individual transfer apron carriers to be engaged with the depending flanges 344 and 346 on the retreating pusher 342 preparatory to being retreated.

These operations are indicated, in Figure 29 at the same stage which is illustrated in Figure 3. That is to say, the carriers for the transfer aprons 210 and 220 are then engaged by the retreating pusher 342 which stands at the extremity of its retreating movement and is just about to begin its advance movement. This is the same position of the parts shown also in Figure 4. In the meantime, while the carriers for the aprons 210 and 220 have been retreated, the carrier for the apron 200 has been advanced as shown in Figure 29. Thereafter the retreating pusher 342 is rapidly advanced to the position shown in Figure 30, where it dwells at rest while the transverse movement of the main transfer apron carriage moves all of the apron carriers toward the left in Figure 30 and incidentally brings a part of the cross bar 325 of the carrier for the apron 200 into the path of the depending flange 346 on the retreating pusher 342. Since, however, the retreating pusher 342 then dwells at rest for a considerable period, this incidental relationship between the cross bar 325 and the flange 346 remains functionless for the time being. In the next ensuing transverse movement of the main transfer apron carriage, the parts are brought to the positions diagrammed in Figure 37, and at that time the flange 346 of the retreating pusher 342 engages the cross pieces 325 and 345 respectively of the carriers for the aprons 200 and 210. Thus the time consumed in the advance movement of the retreating pusher 342, from the position indicated in Figure 29, followed by the prolonged dwell of the retreating pusher 342 at the advance extremity of its movement, suffices to permit the relationships to be changed from those shown in Figure 29, through those shown in Figures 30 and 31, to those indicated in Figure 37. Then at the end of the dwell of the retreating pusher 342, it begins its retreating movement which retreats the aprons 200 and 210.

Similarly when the main transfer apron carriage is taking its steps of movement toward the right in Figures 28 and 27, the advance movement and the dwell of the retreating pusher 342 permit the parts to assume the relationships shown in Figures 28 and 33, before the retreating movement is begun to retreat the aprons 210 and 220. In other words, within the duration of the advance movement plus the dwell of the retreating pusher 342, one pair of transfer aprons (either the pair 200 and 210, or the pair 210 and 220) bearing two batches of biscuit, will have been placed in alignment with respective oven bands in readiness to begin the deposit of biscuit on the oven bands, and that deposit, by two transfer aprons simultaneously, occurs during the ensuing retreating movement of the pusher 342 and the carriers for the particular pair of transfer aprons which at the time are subject to retreat thereby.

In each instance, while a transfer apron is receiving a batch of biscuit, and is then being farther advanced toward the oven bands, and while it is being moved transversely into alignment with the appropriate oven band to which it is to deliver biscuit, the apron itself remains fixed in relation to its individual carrier. That is to say, during all the movements mentioned, the rolls 301, 302 (Figures 5 and 6) do not rotate, but remain at rest so that the transfer apron 200, for example, is simply transported bodily with its carrier but without any linear movement of the apron on the carrier. When, however, any of the aprons has received a batch of biscuit and is finally aligned with the appropriate oven band in proper position to begin depositing biscuit, it is desirable then to provide not only the retreating movement of the transfer apron carrier itself, but also an advancing linear movement of the apron in relation to its carrier, to assist in depositing the biscuit on the oven band.

Besides being mounted on its rolls 301 and 302, each transfer apron has its transfer blade 202 which is fixed upon its carrier and advances and retreats with the carrier. The purpose alluded to is to cause the transfer apron 200, for instance, to advance linearly over the extremity of the transfer blade 202 while the transfer blade and the apron carrier are being retreated. This operation coordinates the advancing movement of the receiving oven band, the advancing linear movement of the transfer apron, and the retreating movement of the transfer blade, so that biscuit are efficiently deposited upon the oven band. In the specific machine, however, the only time when it is desirable to produce this advance of the transfer apron over its blade, is during the cycle in which biscuit are being delivered to the oven band. The means for thus advancing each transfer apron on its carriage, during the desired interval, is next described, by special reference to Figures 23, 24 and 27.

In Figure 23 is shown in dotted lines a rack bar 370 which is permanently fixed upon the longitudinal bar 206 of the main transfer apron carriage. This particular bar 370 pertains to the transfer apron 200. This same rack bar 370 and its relation to the longitudinal frame pieces 206 is shown in end elevation at the extreme left of Figure 24. Similar rack bars 371 and 372 (Figure 24) pertain respectively to the transfer aprons 210 and 220. Thus all of the rack bars 370, 371 and 372 are fixed upon the main transfer apron carriage and reciprocate transversely therewith, but said rack bars have no longitudinal movement.

In Figure 23 is shown the relationship between the apron rolls 301, 302 and the rack bar 370, which is typical of like relationships on the other two individual transfer apron carriers. Figure 25, a section on the line 25—25 of Figure 23, shows these relationships in a substantially horizontal section, but it should be borne in mind that Figure 25 shows the section as viewed from the right toward the left in Figure 23 and also from right to left in Figure 27. The roll 302 has fixed thereto a gear 373 which meshes with a gear 374 fixed to the roll 301. Hence the rolls 301 and 302 must rotate concurrently when one of them is driven. The roll 302 is equipped with a one-way clutch 375 by which at appropriate times the roll 302 is clutched to a gear 376 that is continually in mesh with the longitudinally stationary rack bar 370. The arrangement of the one-way clutch 375 is such that the gear 376 is clutched to the roll 302, to rotate the latter, only when the individual transfer apron carrier is being retreated toward the left in Figures 23 and 27. During that movement the gear 376 is being rolled toward the left in mesh with the longitudinally stationary rack 370, and therefore the gear 376 is being positively rotated contra-clockwise in Figure 23. During this movement the gear 376 is clutched to the roll 302 and rotates the latter also contra-clockwise. By reason of the gears 373, 374 connecting the rolls 301, 302, the roll 301 is rotated clockwise, and this advances the upper run of the transfer apron 200 linearly over its transfer blade 202. Thus this advancing of the upper run of the apron 200 in relation to its transfer blade 202 is initiated as soon as the individual transfer apron carrier is started in its retreating movement from the position shown in Figure 37, i. e., the retreating movement produced by the retreating pusher 342 already described. The rotation of the rolls 301 and 302 and the advance movement of the upper run of the transfer apron 200 continue throughout the delivery of biscuit from the transfer apron to the oven band, and in the specific arrangement, continue also throughout the retreating movement of the carrier.

During the advance movement of the transfer apron carrier, toward the right, in Figures 23 and 27, the gear 376 is not clutched to the roll 302, and therefore simply rolls idly along the rack bar 370 and the rolls 301 and 302 remain without any rotation while the transfer apron carrier is being advanced.

Recapitulating the relationships above described:

A batch of biscuit is delivered from the main delivery apron 100 to the transfer apron 200 while the main delivery apron 100 is being linearly advanced over the main delivery blade 102, and while the main delivery blade 102 is being retreated toward the left in Figure 5, and while the carrier for the delivery apron 200 is being advanced toward the right in Figure 5, but without any linear movement of the transfer apron 200 in relation to its own transfer blade 202. Subsequently, after the carriers for the transfer aprons 200 and 210 have been moved transversely and have been advanced into alignment with the oven bands 300 and 310 and into the positions shown in Figure 37, the batches of biscuit previously deposited on the aprons 200 and 210 are delivered to the oven bands 300 and 310 while the latter are advancing (upwardly in Figure 37), and while the carriers for the transfer aprons 200 and 210 are being retreated (downwardly in Figure 37), and while the transfer aprons 200 and 210 are being advanced linearly over their delivery blades by the rotation of the gear 376 (Figures 23 and 27) which is then clutched to the roll 302.

Thus far, the operations of the ultimately acting elements of the machine have been explained. The next following description will be devoted to the origination and transmission of power for the several operations and their relative timing.

Figure 4 is an enlarged section of the rear part of the machine on the line 4—4 of Figure 3; and Figure 7 is a horizontal section, viewed from above on the line 7—7 of Figure 4. The main driving shaft 400 is connected with the driving drum 101 for the main delivery apron 100, through a change-speed transmission comprising the driving disks 401, 401, the belt 402 and the driven disks 403, 403, the latter being mounted on the driven shaft 404. The drawings do not show the mechanism for adjusting this transmission to produce speed changes, but such mechanism may be of any suitable type as illustrated in the C. H. Williams Patent No. 1,648,174, granted November 8, 1927, in which a hand-wheel 28, in conveniently accessible location, may be used for effecting speed changes of the driven parts. A similar hand-wheel for like adjustment will be employed upon the machine of the present application for changing operating speed of the shaft 404, and therethrough the speed of the drum 101 and the linear speed of the main delivery apron 100, for purposes well understood by those skilled in the art.

Figure 11 is a vertical section viewed from right to left on the line 11—11 of Figure 4. As there shown the driven shaft 404 has thereon a pinion 405 meshing with a gear 406 on a shaft 407 which also carries a pinion 408 that meshes with the gear 409 fixed on the shaft 410 of the driving drum 101 for the main delivery apron 100.

In the illustrative machine, the change-speed transmission is employed for determining a desired speed of the main delivery apron 100, and the adjustment for that purpose may be made independently of any other speed adjustment presently described.

The main driving shaft 400 also has a change-speed drive through a tumbler gear mechanism shown in vertical sections in Figures 12 and 13 which are viewed from right to left on the respective section lines 12 and 13 of Figure 4. A gear 411 fixed on the shaft 400 continuously drives a tumbler gear 412 mounted between rocker arms 413 and 414 which are pivotally mounted on bushings on the shaft 400. The tumbler gear 412 is engageable with any one or another of a series of different sized gears 415 keyed to a sleeve 416 which is mounted for rotation on a shaft 417.

The axial adjustment of the tumbler gear 412 is effected through the interiorly threaded sleeve 418 mounted on a correspondingly threaded shaft 419 which may be rotated by a handle 420 on the exterior of the machine, the handle being provided with a spring-pressed locking plunger which can be seated in stop pockets on the machine frame. The threaded sleeve 418 is pivotally connected at 421 with the rocker arms 413, 414.

The adjustment of the tumbler gear 412 radially in relation to the driven gears 415 is effected through an upward extension of the rocker arm 413 which provides a segmental rack 422 engaging elongated gear teeth 423 on a shaft 424 which carries a conveniently accessible adjusting handle 425 having a spring-pressed locking plunger which may be seated in any of the stop pockets 426 shown in Figure 2.

The change-speed adjustment just described is used for determining the operating speeds of the various parts which are driven from the shaft 417, namely the horizontal reciprocation of the main delivery blade 102 and the various travels of the transfer aprons. These operations are timed relative to each other, and with various individual adjustments, as later described; but it is desirable at times to make positional adjustments of those operations collectively in relation to the drive of the main delivery apron 100, regardless of the particular speed adjustment prevailing at any given time through the tumbler gear 412. To suit this purpose, the driven change-speed gears 415 are mounted, as already said, on a sleeve 416 which is rotatable on the shaft 417.

The outer end of the sleeve 416 has keyed thereon a worm gear 430 (Figure 13) which is adjustably coupled, by a train of gearing, to a collar 431 fixed upon the shaft 417. The coupling gearing is shown in end elevation in Figure 14, in plan in Figure 7 and in side elevation in Figures 2 and 32.

The worm gear 430, fixed upon the sleeve 416, is engaged by a worm 432 mounted in a bearing of a bracket 433 supplied by a radial extension of the collar 431. That is to say, the collar 431, its bracket 433, and the bearing for the worm 432 are all fixed upon and rotated with the shaft 417 (Figures 13 and 14). At one end of the worm 432 is fixed a bevel gear 434 which meshes with another bevel gear 435 fixed upon a shaft 436 which is also mounted in the bracket 433. At the extremity of the shaft 436, opposite to the bevel gear 435, is a pinion 437 that meshes with a pinion 438 also mounted on the bracket 433; and the pinion 438 meshes with a small pinion 439 (Figure 13) mounted upon a sleeve which is freely rotatable upon the shaft 417. Also fixed upon the same sleeve with the pinion 439 is a second pinion 440 which meshes with the large gear 441 having a handle 442 by which it may be conveniently rotated manually.

Since the sleeve 416 (Figure 13) is continuously entrained with the driving tumbler gear 412, the sleeve 416 and its worm gear 430 are continuously driven elements. The rotation of the worm gear 430 carries with it the worm 432 in bodily rotation, and therewith the bevel gears 434, 435, the bracket 433, the pinions 437 and 438, all of which travel bodily in a circular orbit about the axis of the shaft 417. Under normal circumstances, the worm gear 430 and the worm 432 are locked together, and similarly the bevel gears 434, 435, and the pinions 437 and 438 are locked together so that none of them rotates upon its own axis. Since the pinion 438 meshes with the pinion 439, they too remain locked together normally and the pinion 439 rotates on the axis of the shaft 417. The pinion 440 being fixed upon the same sleeve with the pinion 439 these two rotate together and the pinion 440 rotates the gear 441. As already said these several movements continue during normal operation of the machine. When, however, it is desired to change the positional relationship of the shaft 417 and the parts driven thereby, relatively to the shaft 404 and the main apron drum 101 driven therefrom, that positional adjustment may be effected by rotating the large gear 441 by means of the handle 442. The resulting adjustment produces a change in the angular relationship between the sleeve 416 and the shaft 417.

Assuming that a desired speed adjustment has been made through the transmission 401, 402, 403, and an appropriate speed adjustment has been made through the tumbler gear mechanism 412, 415, the effect is that the sleeve 416 is continuously entrained with the apron drum 101. But the positional adjustment of the numerous parts driven by the shaft 417 may not be appropriate. Under such circumstances the angular relation of the shaft 417 to the sleeve 416 may be changed so that all of the operations driven from the shaft 417 may be advanced or retracted for purposes of producing a collective adjustment of those operations.

Turning the handle 442 and the gear 441, when the machine is at rest or in motion, will rotate the pinion 440 and its connected pinion 439; the latter will rotate the pinion 438 which in turn will rotate the pinion 437 and its shaft 436; thereby the bevel gear 435 will be caused to rotate the bevel gear 434 and the worm 432 which will be caused to progress around the circumference of the worm 430 (which remains entrained with the tumbler gear 412). This circumferential progression of the worm 432, in either direction, clockwise or the reverse in Figure 32, will correspondingly rotate the bracket 433 (upon which the worm 432 is mounted) and the collar 431 which is fixed upon the shaft 417. The effect is to rotate the shaft 417, in relation to the sleeve 416, in either direction as may be desired.

As shown in Figure 13, the shaft 417, at the right-hand end thereof, carries a bevel gear 443 meshing with another bevel gear 444 at a vertical shaft 445 having at its top a bevel gear 446. As shown in Figure 4 the bevel gear 446 meshes with the bevel gear 447 on the shaft 137 which extends lengthwise the machine as shown in Figure 3 and, through the bevel gears 136 and 135 operates the cam 132 (Figure 2) that controls the lifting and depression of the main delivery blade 102 as already explained.

Also, as shown in Figure 13, the shaft 417 carries a pinion 448 which drives a gear 449 (Figure 4) mounted on a shaft 450. The major movements about to be described are taken from the shaft 450.

The gear 449 on the shaft 450 (Figure 14) meshes with the gear 451 (Figure 15) on the main cam shaft 282 (already referred to) which carries the crank disk 281. The cam shaft 282 is continuously driven from the shaft 450.

Figure 8:
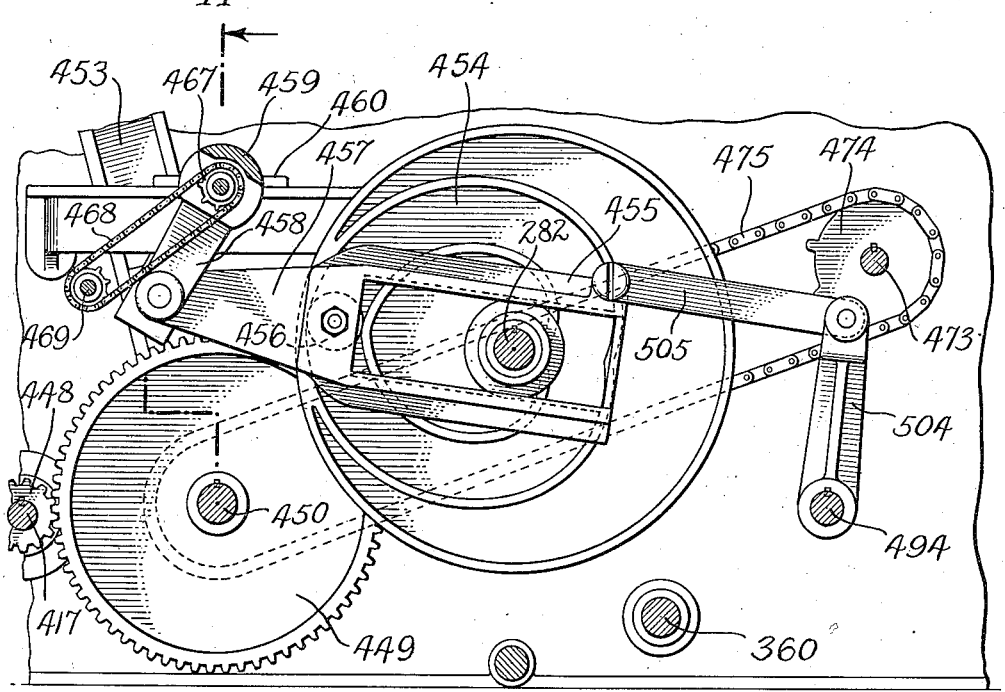
Figure 8 is a detail side section on vertical planes indicated by the line 8—8 of Figure 7.

In Figure 14, rotatably mounted on the shaft 450 are the two upwardly extending arms 453, 453 which carry at their upper extremities the segmental gears 113, 113 for horizontally reciprocating the main delivery blade 102 as described above, through its racks 112, 112 and the connected frame pieces 111, 111. The arms 453, 453 are oscillated by a cam 454 mounted on the shaft 282 as shown in Figure 8. (Incidentally, the section line 14—14 of Figure 8 indicates generally the planes upon which the sections in Figure 14 are drawn; and the section line 8—8 of Figure 14 indicates the plane of Figure 8.) A yoke 455 straddles the shaft 282, carries the cam roller 456, and supplies the pitman 457 pivoted to a rocker arm 458 which depends from a hollow shaft 459 (Figure 14) mounted to rock in bearings 460, 460 fixed on the machine frame. At its opposite ends the hollow shaft 459 carries depending rocker arms 461, 461 formed with slideways to receive radially adjustable slide-blocks 463, 463 which project into cross-heads which slide in ways provided in the rocker arms 453, 453. Each slide-block 463 carries a non-rotatable nut 462 which engages a rotatable threaded shaft 464 mounted in a rocker arm 461.

The cam 454 (Figure 8) is heart-shaped, and therefore produces reciprocation, at uniform speed, of the pitman 457 which in turn rocks the arm 458 (Figure 14) and the hollow shaft 459 with its depending rocker arms 461, 461. The latter through the slide-blocks 463, 463 oscillate the rocker arms 453, 453 mounted on the shaft 450 and thereby reciprocate the main delivery blade 102.

In order to adjust the speed and extent of horizontal reciprocation of the main delivery blade 102, an adjusting mechanism is provided by which to move the slide-blocks 463, 463 radially toward and from the axis of the shaft 459 so as to increase or decrease the throw of the upper ends of the rocking levers 453, 453 at which the segmental racks 113, 113 are provided. For this purpose, the threaded shaft 464 is provided in each of the depending rocker arms 461, 461 of the shaft 459. Each shaft 464 is threaded into a nut 462 so that the turning of the shaft 464 will move the block 463 radially of the shafts 450 and 459. At the upper end of each shaft 464 is a bevel gear meshing with a bevel gear fixed upon a shaft 466 which is journaled in the interior of the hollow shaft 459. At the middle part of the shaft 466 is mounted a sprocket wheel 467 connected by a sprocket chain 468 with a sprocket mounted on a shaft 469 extending to the exterior of the machine where it is provided with a hand-wheel 470. By turning the hand-wheel 470 and rotating the shaft 469, the sprocket chain 468 rotates the shaft 466 which in turn rotates the threaded shafts 464 and radially adjusts the slide-blocks 463. This adjustment can be made while the machine is in operation for the purpose of predetermining the desired speed of horizontal reciprocation of the main delivery blade 102. Obviously the described adjustment may be used to predetermine such speed of horizontal movement of the main delivery blade 102 as may be needed to coordinate that movement with the speed of travel of the main delivery apron 100. For example; the linear speed of the apron 100 may be changed through the transmission 401, 402, 403 as already described; and it is desirable to have a corresponding adjustment of speed of the main delivery blade 102 such that the latter will be advanced (toward the right in Figures 5 and 6) in unison with the linear speed of the apron 100; and this illustrates a character of adjustment available through operation of the hand-wheel 470.

Referring next to the mechanism for producing the first advance movement of the individual transfer apron carriers, which movement occurs during the retreat of the main delivery blade 102 and is coordinated therewith to perform one cycle of delivering biscuit from the main apron 100 to a transfer apron: As already explained (see Figure 5), this advance movement of the transfer apron carrier is produced by the one or another of three pushers (e. g. the pusher 327) mounted on the sprocket chain 328. In Figure 4 the chain 328 is shown on its driving sprocket 471 which is fixed on a sleeve 472 rotatably mounted on a shaft 473. Fixed on the shaft 473 (Figure 8) is the driven sprocket 474 connected by the chain 475 with the sprocket 476 (Figure 14) fixed on the shaft 450. Thus the drive from the shaft 450, through the chain 475, the sprocket 474, the shaft 473, sleeve 472, and sprocket 471, propels the chain 328 in a clockwise direction to operate the pusher 327 and its fellows (Figure 5) as already explained. If the sleeve 472 were fixed upon the shaft 473, this train of mechanism would give the chain 328 and pusher 327 a uniform speed. In the specific machine, however, it is desired to have the pushers 327 travel at relatively slow speed (while on the upper run of the chain 328) during the advance pushing of a transfer apron carrier, and then to have the pushers retreated (while on the lower run of the chain 328) at relatively high speed so as to return each pusher in turn to and around the sprocket 471 and to restore the pusher to the upper run of the chain 328 in readiness for the next succeeding advance pushing operation.

For thus varying the speed of travel of the chain 328 and its pusher 327, (and for other purposes of adjustment later explained) a differential mechanism is employed for coupling the sleeve 472 and the shaft 473, and the differential is operated to produce the desired speed variation. This differential mechanism is shown in Figure 17 which is a vertical section on the line 17—17 viewed from right to left in Figure 4. In Figure 17, the shaft 473 and the sleeve 472 are shown extending toward the left through the main frame of the machine where the sleeve carries a fixed gear 477 and the shaft carries a fixed gear 478. Two intermeshing pinions (of which the pinion 479 appears in section in Figure 17) engage respectively the gear 477 and the gear 478, in the same manner as in the other differential, Figures 18 and 18a, having the pinions 271, 272. With this arrangement the driven shaft 473 drives the gear 478 which through the intermeshing pinions drives the pinions 479, the gear 477, the sleeve 472 and the sprocket 471. The intermeshing pinions 479 are mounted in the differential housing 480 which carries a fixed worm gear 481 engaged by a worm which is fixed upon the same shaft with a bevel gear 482 (Figure 7). The shaft for the worm and the bevel gear 482 are mounted in arms 483, 484 which are free on bushings encircling the sleeve 472 and the shaft 473. Also mounted in the arms 483 and 484 is a shaft 485 having at one end a bevel gear 486 engaging the bevel gear 482, and havin at the other end a hand-wheel 487 (Figures 2, 7 and 17). By turning the hand-wheel 487 in one direction or the other, the differential housing 480 may be adjusted angularly in relation to the arms 483, 484, the effect of such adjustment being presently explained.

The arm 484 (Figure 7) is radially extended to receive the pivotal connection 488 of a link 489 (Figure 2), the opposite extremity of which is connected by a pivot pin 490 (Figures 17 and 32a) with a slide-block 491 arranged to slide adjustably in the arc-shaped slot of a rocking segment 492 (Figure 32a) which segment forms part of or is fixed to a sleeve 493 keyed to the rocker shaft 494. The parts just referred to are illustrated on an enlarged scale in Figure 32a, the arrangement being such that the oscillation of the shaft 494, by means presently described, operates the link 489 to oscillate the arm 484 (Figure 2) and thereby oscillate the differential housing 480 (Figure 17).

The amplitude of oscillation of the shaft 494 is fixed in the specific machine, and in order to provide for varying the oscillation of the differential housing 480, and thereby varying the speeds of the pushers 327 (Figure 5), an adjustment is supplied for moving the pivot pin 490 to greater or less distances from the axis of the shaft 494. Thus adjustment (Figure 32a) is effected through a hand-wheel 495 on a shaft 496 mounted in a fork 497 integral with the link 489. On the shaft 496 is a bevel gear 498 (Figure 17) which meshes with a bevel gear 499 (Figure 32a), also mounted on the structure of the link 489. Fixed on the same shaft with the bevel gear 499 is a worm 499a (Figure 32a) which engages a worm gear 500 keyed upon a sleeve 501 (Figure 17) which at its other end carries a pinion 502. The sleeve 501, with its fixed worm gear 500 and pinion 502, are rotatably mounted on the pivot pin 490. The pinion 502 meshes with a rack 503 which is a fixed part of the segmental rocker arm 492. With the described arrangement, the turning of the hand-wheel 495, rotates the sleeve 501 in one direction or the other and causes the pinion 502 engaging the rack 503, to travel toward or from either side of the axis of the shaft 494 and thereby determine the amplitude of oscillation of the differential housing 480 imparted thereto by the link 489.

The oscillation of the shaft 494 is produced through a rocker arm 504 (Figures 8 and 17) fixed upon the shaft 494 and connected at its upper end by a link 505 with the yoke 455 carrying the cam roller 456 which is reciprocated uniformly by the heart-shaped cam 454 (Figure 8). This uniform reciprocation of the yoke 455, producing uniform oscillation of the shaft 494, is communicated, through the rocking segment 492 and link 489, to oscillate the differential housing 480. And the described adjustment of the link 489 in relation to the rocking segment 492, is such that the differential housing 480 may be oscillated through different amplitudes and at different speeds, with the result of advancing the pusher 327 at any desired speed, to produce a corresponding speed of advance movement of the transfer apron during the deposit of biscuit thereon from the main delivery apron 100.

As already said, the adjustment by the hand-wheel 470 (Figure 14) which shifts the slide-blocks 463 radially in relation to the shaft 450, may be used to adjust the speed of the main delivery blade 102 so that its speed of retreating movement, during the deposit of biscuit on a transfer apron, may be desirably regulated. Also by the hand-wheel 495, as just described, the simultaneous speed of advance movement of the then receiving transfer apron may be regulated to suit the speed of the main delivery blade.

Also through the hand-wheel 487 (Figures 2 and 17) the angular relation between the sleeve 472 and the shaft 473 may be adjusted so as to change the positional relation between the sprocket 471 on the sleeve 472 and the sprocket 474 on the shaft 473, the result of which is to change the positional relation between any pusher 327 (controlled by the sprocket 471) and the main delivery blade 102 which is continuously, though adjustably entrained with the sprocket 474 through the shafts 450 and 282 (Figure 4) and the segmental gear 113 and rack 112 for reciprocating the main delivery blade 102. Since the pushers 327 advance the transfer aprons during deposit of biscuit thereon, the adjustment just described may be used to assist in reconciling the movements of transfer apron and main delivery blade 102.

The foregoing description has correlated the uniform linear advance of the main delivery apron 100 (subject, however, to adjustable speed thereof); the longitudinally reciprocating movements of the main delivery blade 102; and the advance movement of the pushers 327 (Figure 5) which produces the advance movement, during a biscuit-receiving cycle, of which ever transfer apron carrier is aligned at the moment with the main delivery apron 100. As already said, the pushers 327 advance the delivery aprons each through an initial step, which is later followed by a short advance movement caused by cooperation of the respective rollers 332, 334 and 335 (Figure 28) with one or another of the stationary cams 336 and 337. This second step of advance movement of the transfer aprons is produced during the transverse movement of the main transfer apron carriage though the chain drive illustrated in Figure 20, and by the transmission next described.

Referring to Figures 3 and 18, it has already been explained that the transverse movement of the main transfer apron carriage is produced through the train of mechanism from the sprocket 275 (Figure 18) through the differential 271–273 to the shaft 269, and thence from the bevel gear 268 to the bevel gear 267 (Figure 3). The sprocket 275 is driven by the chain 278 which passes around a sprocket 510 (Figure 7) fixed on a sleeve 511 mounted rotatably on the cam shaft 282. Also fixed upon the sleeve 511 is a gear 512 (Figures 7 and 15) which is driven by a gear 513 fixed on the shaft 450. Thus, the drive for the transverse movement of the transfer apron carriage is taken from the shaft 450, through the intermediate sleeve 511 and its gear 512 which are mounted on the cam shaft 282, but are rotatable thereon.

On the same sleeve 511 is fixed the cam 362, already mentioned, which (Figure 4) oscillates the segmental gear 359 to reciprocate the retreating pusher 342 that retreats the transfer apron carriers during their deposit of biscuit at the oven. Therefore, the drive for retreating the transfer aprons is also entrained with the shaft 450.

Likewise, the drive for advancing the transfer aprons by the pushers 327, is entrained with the shaft 450, through the sprocket chain 475 and sprockets 474 and shaft 473 (Figures 4 and 7).

Hence, the transverse and retreating and advancing movements of the transfer aprons are primarily coordinated by being entrained all with the same drive shaft 450, and the respective cycles of movement occur in the desired time relations, while all are subject to collective speed and positional adjustments already described (through the tumbler gear mechanism 412, 415 Figure 4), and the capacity for adjustment between the shaft 417 and sleeve 416 (Figure 13), through the hand-wheel 442 (Figure 14).

The respective transfer apron movements are subject to individual regulation to suit various requirements. The transverse movement of the main transfer apron carriage has its speed individually controlled by the differential mechanism 271, 273 (Figure 18). The advance movement of transfer apron carrier (while receiving biscuit from the main apron 100) has its speed individually controlled, and its positional relations determined, through the differential 477, 478 and the adjusting hand-wheels 487, 495 (Figure 17).

The above-explained capacities for variations and adjustments of the several operations of the machine have related to the transporting and delivering of biscuit from a source (e. g., a biscuit-forming mechanism) to the vicinity of the oven in which they are to be baked. There are numerous conditions which make it desirable to provide for different time periods of baking, involving in some instances variable speeds of travel of oven bands or other types of biscuit-receiving means at the oven; and when oven band speed (for example, is materially changed, corresponding changes in other operations of the apparatus may be necessary or desirable.

To illustrate means for varying time periods of baking, Figure 2 shows the oven band 300 driven by a change-speed transmission including a driving shaft 600, discs 601, belt 602, and discs 603 on the driven shaft 604 upon which is mounted the main drum for the oven band 300. The shaft 604 may be common to the drum or drums for all the oven bands 300, 310, 320 and 330 illustrated in Figure 3, in which case only the one change-speed mechanism need be employed. The illustrated transmission (or its equivalent) may be adjusted for speed changes by the usual means comprising preferably a hand-wheel conveniently accessible on the exterior of the apparatus.

When the linear speed of the oven bands is increased, the biscuit will travel through the oven more rapidly and the duration of the baking time will be correspondingly reduced, and vice versa. For baking any given character of biscuit, the duration of baking time should be constant for successive batches; hence the speed adjustment through the transmission 601, 602, 603 may remain the same throughout an indefinite series of delivery and transfer operations of the other described mechanisms.

Any substantial changes in linear speed of the oven bands or their equivalents may be accompanied by an appropriate speed adjustment of the other parts of the apparatus, collectively, as by adjusting the speed of the shaft 400 (Figure 4) which is the main driving shaft of the apparatus. It is unnecessary to illustrate a change-speed mechanism for the shaft 400, since its speed may be made adjustable by various means which will be readily apparent to those skilled in the art. For instance, the shaft 400 may be driven from a power shaft through a change-speed mechanism similar to 401, 402, 403 (Figures 4 and 7), already described, and such change-speed mechanism will be controlled preferably by a hand-wheel conveniently accessible on the exterior of the machine so as to be adjustable while the machine is in operation. Such adjustment of the speed of the shaft 400 will have the effect of changing the speed of all the driven parts of the apparatus collectively, while leaving them nevertheless susceptible of the numerous individual adjustments herein described. Thus, the oven band speed and the collective timing of the other operations may be reconciled by two main adjustments, while the various subordinate adjustments may be effected appropriately to special conditions.

Whatever may be the speed adjustment for the shaft 400 and for the travel of the oven bands (or their equivalent) it is important to reconcile with the oven-band travel the speed at which biscuit are delivered off from the transfer aprons onto the bands or other receiving means at the oven. For instance: In the specific machine the speed of linear advance of each transfer apron, while depositing biscuit, should be so related to the speed of linear advance of the oven band that the latter shall receive the biscuit in desired arrangement as between individual biscuit and successive batches thereof. Generally speaking, and particularly when the apparatus is dealing with peels of biscuit attached to each other in a batch, the transfer aprons and the oven bands, during delivery of biscuit from the former to the latter, will be caused to advance in unison, at the same linear speed, so that the biscuit will be deposited on the oven bands in the same relationship which they had on the transfer aprons,—i. e., when peels are being handled they will be deposited on the oven bands without being either stretched or wrinkled. While the transfer aprons and oven bands are thus advanced in unison, the transfer apron blades (e. g., 202, Figure 5) are retreated from the forward positions shown in Figure 37 to uncover the oven bands progressively as the biscuit are laid thereon.

Since the oven band speed is made variable in the illustrative machine, the speed of linear advance of the transfer aprons during their delivery of biscuit is also made variable, so that the two speeds may be reconciled for the purposes just suggested. In general this latter result may be obtained by mutual adjustment of the speed of main shaft 400 and of the oven-band drive 601, 602, 603. But to suit special needs the speed of linear advance of the transfer aprons may be determined and varied independently, through the differential mechanism, already alluded to, which is interposed (Figure 16) between the driven shaft 357 and the pinion 358 sleeved on said shaft.

Referring to Figure 16: The pinion 358 (driven by the oscillated segmental gear 359) is fixed on a sleeve 620 which is rotatable on the shaft 357. Also fixed on sleeve 620 is a gear 621 that meshes with an intermediate pinion 622 which in turn meshes with a second intermediate pinion 623. The two intermediate pinions 622, 623 have their shafts mounted in the differential housing 624 which is oscillable on the shaft 357. The second intermediate pinion 623 meshes with a gear 625 fixed on the shaft 357 for driving it and its gears 355 and 356 which reciprocate the retreating pusher racks 353, 354.

The differential housing 624 has exterior gear teeth 630 meshing with a gear 631 fixed on a rock shaft 632 which is journaled in the machine frame. A rocker arm 633 is fixed on the shaft 632 and is connected by a link 634 with a pivot pin 635 in a slide-block 636 which is mounted to slide adjustably in the arc-shaped slot of a rocking segment 637. That rocking segment forms part of or is fixed on a sleeve 638 keyed to the rocker shaft 360. By this arrangement, the rocking of the shaft 360 (through the cam 362, Figure 16) rocks the segment 637 and operates the link 634 to rock the pinion 631 to oscillate the differential housing 624 about the axis of the shaft 357.

The described oscillation of the differential housing 624 in one direction drives the shaft 357 at relatively high speed; and that rapid movement is employed to advance the racks 353, 354 and their pusher bar 342 (Figure 28) toward the ovens. During that travel the pusher bar 342 is moving idly toward the advance position at which it stands in readiness to pick up certain of the transfer apron carriers and presently to retreat them during their delivery of biscuit on the ovens.

When the differential housing 624 is oscillated in the direction opposite to that just mentioned, the shaft 357 is driven at relatively low speed; and that slow movement is employed for moving the racks 353, 354 and their pusher bar 342 away from the oven, so that the retreating movement of the transfer apron carriers during their delivery of biscuit at the ovens, takes place at comparatively low speed.

As already explained, the retreating movements of the transfer apron carriers act, through the racks 370 and pinions 376, 373 and 374 (Figures 25 and 27), to cause linear advance of the transfer aprons over their transfer blades so that each apron advances as its blade is retreated; and it is this linear advance of the apron which occurs during the relatively slow speed of retreat of the transfer apron carrier.

Since the retreat of the transfer apron carrier actuates the linear advance of the transfer apron over its delivery blade, it follows that the speed of linear advance of the apron may be changed by changing the speed of retreat of the carrier by the pusher bar 342. Hence, when the oven band speed has been adjusted to an appropriate point (by the transmission 601, 602, 603, Figure 2), the speed of linear advance of the transfer aprons, during their delivery of biscuit, can be adjusted correspondingly by regulating the speed of retreat of the pusher bar 342, and that may be effected by the means next described.

As shown in Figures 16 and 16a, the pivot pin 635 carries a rotatable sleeve having fixed at one end a pinion 640, and at its other end a worm gear 641. The pinion 640 meshes with a rack 642 which forms part of the rocking segment 637. The worm gear 641 engages a worm 643 which is mounted in ears projecting from the slide-block 636. The shaft of the worm 643 carries a hand-wheel 644.

By turning the hand-wheel 644 the pivot pin 635 may be adjusted to opposite sides of and toward and from the rock shaft 360, thereby to shift the pivot pin 635 to one side or the other of the shaft 360, and to change the radius of oscillation of the pin 635. Such adjustment will change the amplitude of oscillation of the differential housing and thereby the extent of reciprocating movement, in each direction, of the retreating pusher bar 342. The adjustment will also change the advancing speed and the retreating speed of the pusher bar 342. Those changes are negligible, however, with the exception of the change in retreating speed of the pusher bar 342, which is employed for the purpose of changing the speed of linear advance of the transfer aprons, during their delivery of biscuit, to reconcile their speed with that of the oven bands.

The distance traveled by the pusher bar 342 (beyond a necessary minimum) is immaterial because the transfer aprons are advanced to their delivery positions independently of the pusher bar 342 which simply picks up the appropriate transfer aprons (wherever they may be) and retreats them at least far enough to complete the delivery of their biscuit batches at the oven, and then may retreat them still farther without affecting the ensuing movements of the transfer apron carriers. Likewise, the speed at which the pusher bar 342 is advanced is immaterial because its advancing movement is idle in any event and has no effect upon other operations.

On the other hand, the speed at which the bar 342 is retreated is of major importance since it determines the speed of linear advance of the transfer aprons while they are depositing biscuit at the oven. Therefore, the described adjustment of the hand-wheel 644 (Figures 2, 16, and 16a) is utilized to regulate the oscillation of the differential housing 624 so as to adjust the speed of linear advance of the transfer aprons, during their deposit of biscuit, to make that speed equal to (or otherwise reconciled with) the speed of travel of the oven bands or their equivalents.

The rocking segment 637 extends on both sides of the shaft 360 (Figures 2 and 16a) permitting a wide scope of adjustment. When the pivot pin 635 is adjusted to a position concentric with the shaft 360, the differential housing 624 will not be rocked in the operation of the machine and therefore the transmission through the differential will reciprocate the racks 353, 354 at the same speed in both directions. That adjustment may prevail when the transfer apparatus is otherwise synchronized with the oven band speed. When, however, it is required to adjust the oven band speed out of such synchronism, for any purpose,—the adjustment of the pivot pin 635 toward one side or the other of the shaft 360, and to a proper radial distance therefrom, may be used to reconcile the speed of linear advance of the transfer aprons with the speed of travel of the oven bands.

It is to be understood that the showing of four separate oven bands is merely illustrative of provision for such a receiving area or separate receiving areas, related to an oven structure, as may be appropriate to the deposit of biscuit by transfer apparatus embodying the present invention. In other words, the details of oven structure and the particular character of the receiving oven bands or the like may be varied widely in the application of this invention. At the same time, the invention may be employed with perhaps the greatest advantage if the receiving elements which transport the biscuit into the oven have substantially uninterrupted biscuit-supporting surfaces (as well exemplified by an endless metal band) so that an indefinite succession of biscuit may be disposed thereon with a maximum economy of space and with a uniform relationship between the biscuit and such heated area of the receiving surface as may be exposed adjacent the biscuit.

It is an important consideration that biscuit be baked as uniformly as possible. That is to say, each biscuit should be baked uniformly throughout its area, and different biscuit should be subjected to uniformity of baking conditions so as to produce uniform quality of product. To this end, it is important that all biscuit be accurately disposed upon the supporting surface in the oven, so far as practicable, so that no biscuit or no row of biscuit shall be exposed to abnormal heat as compared with other biscuit or rows.

For instance, if biscuit are being introduced into the oven in batches consisting respectively of peels or sheets of connected biscuit, it is important that the rear edge of one peel and the advance edge of the next following peel rest, upon the supporting surface in the oven, as close together as practicable, and substantially in contact, so as to leave little if any of the supporting surface exposed between one peel and the next. Otherwise, the heat emanated from an exposed area of the supporting surface would tend to overbake the immediately adjacent portions of the peels so that the biscuit at the peel-edges would be baked abnormally compared with other biscuit in the interior of a peel area.

Similarly, when biscuit are being delivered, not in peels or sheets, but as separate individual pieces, spaced apart more or less from each other longitudinally of the batch of biscuit, it is important that the rear row in one batch and the advance row on the next following batch be spaced apart on the supporting surface in the oven by the same interval which occurs between rows within a batch. The desired results are procured, in the operation of the illustrative machine, by causing each transfer apron to deposit a succession of batches of biscuit (whether in peels or as separated pieces) in such manner that numerous batches, while present in the oven, will have each biscuit, from end to end of the series of batches, positioned in substantially uniform relationship to all neighboring biscuit and to such adjacent area (if any) of the oven-supporting surface as may be exposed.

The operation of the illustrative machine may be briefly characterized as one in which a continuous succession of uniformly related biscuit is transported on the main delivery apron 100; from that continuous succession, the machine separates off individual batches of biscuit which are received by the successively acting transfer aprons; and thereafter the cooperation of the transfer aprons with the oven band or bands produces the effect on each band (or equivalent receiving area) of restoring the biscuit to the condition of a continuous succession of uniformly related biscuit. In other words, the preferred operation is that the continuous flow of biscuit on the main delivery apron 100 is broken up into distinguishable batches on the transfer aprons; but when the biscuit have been delivered into the oven, the batches are no longer distinguishable but are merged, in effect, in a continuous series of biscuit. In this manner, the highest economy of oven space is achieved, as well as the greatest degree of uniformity in the baking of the individual biscuit. The ultimate result of this perfection of disposal of the biscuit in the oven, is to avoid waste resulting from overbaking biscuit and to utilize biscuit-receiving space in the oven to its highest capacity.

For more detailed explanation of the operation of the machine, it is convenient to assume certain hypothetical conditions. For example, it will be assumed that the succession of biscuit on the main delivery apron 100, is to be taken off in respective batches thirty inches long. For this purpose, starting with the parts in the positions shown in Figure 33, the main delivery blade 102 will be retreated fifteen inches; the carrier for the transfer apron will be advanced fifteen inches; thereby a thirty-inch length of the transfer apron 200 will have been exposed. During the same interval of time, the main delivery apron 100 will have advanced linearly fifteen inches, but the simultaneous retreat of the main delivery blade 102, also to the extent of fifteen inches, will have had the effect of withdrawing a thirty-inch length of the delivery apron gradually from beneath a thirty-inch batch of biscuit which thereby are deposited upon the transfer apron.

In this operation, if the linear speed of advance of the transfer apron carrier is equal to the linear speed of the delivery apron 100, the biscuit will be deposited on the transfer apron in the same relationships which they previously had on the apron 100. This is particularly desirable when peels are being produced, because the peel is thereby deposited on the transfer apron without either stretching or wrinkling. When the linear speed of the main apron 100 is changed (through the transmission 401, 402, 403, Figure 4), the speed of advance of the transfer apron carrier, by the pusher 327 may be correspondingly changed through adjustment by the hand-wheel 495 (Figures 17 and 32a) so as to bring the two movements into desired unison.

When separate individual biscuit (as distinguished from peels) are being delivered by the main apron 100, it may be desired to dispose the transverse rows of biscuit farther apart on the transfer apron than they were on the main apron. To serve this purpose, the advancing speed of the transfer apron carrier may be increased (through the hand-wheel 495) so that the transfer apron will move at greater linear speed than that of the main apron 100, and thereby increased spaces will be made to occur between successive transverse rows of biscuit on the transfer apron.

If it be desired to dispose the transverse rows of biscuit closer together on the transfer apron than they were on the main apron 100, then the linear speed of the transfer apron carrier may be reduced below that of the main apron 100, so that the spaces between successive transverse rows of biscuit will be diminished.

For illustration: by speeding up the transfer apron, a batch of biscuit which had occupied a thirty-inch length on the main apron 100 could be spaced so as to occupy a thirty-four inch length on the transfer apron. By slowing down the transfer apron, a batch of biscuit which had occupied a thirty-inch length on the main apron 100, could be spaced so as to occupy only a twenty-six inch length on the transfer apron.

Regardless of the speed at which any transfer apron carrier is advanced, it will be delivered ultimately, by a pusher 327 to approximately the position of the apron 200 shown in Figure 29 (or Figure 34). Thereupon, the next ensuing transverse movement of the main transfer apron carriage, will move the appropriate transfer apron carrier bodily through its final advance step, by the action of one of the cams 336, 337.

Referring to Figure 37: It is assumed that the transfer aprons 200 and 210 are loaded with thirty-inch batches of biscuit (peels, for example). The next step is to deposit those batches upon the oven bands 300 and 310. This depositing cycle, for delivering simultaneously these two thirty-inch batches, to the oven bands, occupies the same period of time, in the specific machine, which is consumed by the operation of delivering another batch from the main apron 100 to the delivery apron 220; and the movements of the parts from the respective positions shown in Figure 37 to those shown in Figure 38 occur in that same interval of time, by reason of the above explained coordination of the various transmission mechanisms.

As already said, the delivery of the thirty-inch batch of biscuit from the main apron 100 occurs during the interval while the main apron 100 is advancing linearly through fifteen inches. In the specific machine, the oven bands are preferred to travel at about one-quarter of the linear speed of the main apron 100. Hence, while the main apron 100 is traveling its fifteen inches, to deliver a thirty-inch batch of biscuit, the oven bands will simultaneously travel three and three-quarter inches. It follows that the thirty-inch batches on the transfer aprons 200 and 210 are to be delivered to the oven bands during the interval while the oven bands are advancing three and three-quarter inches. That is to say, during one of its receiving cycles, the oven band will advance only three and three-quarter inches, or one-eighth of the length of the thirty-inch batch of biscuit. Therefore, during the same interval of time, the transfer blades for the aprons 200, 210 (Figure 37; corresponding to the blade 202 of Figures 1 and 5) should be retreated twenty-six and one-quarter inches, so that the relatively slow advance of the oven band plus the retreat of the transfer blade, will aggregate a thirty-inch length from start to finish of the cycle. At the same time, each transfer apron is advanced linearly on its carrier, so as to travel over its delivery blade through a thirty-inch length of the apron to deposit its thirty-inch batch of biscuit on the oven band. This linear advance of the transfer apron on its carrier is produced by the cooperation of the longitudinally stationary rack 372 and the gear 376 (Figure 27) as the gear 376 is rotated during the retreating movement of the transfer apron carrier. Thus, from the extremity of their advance movements (Figure 37) to the extremity of their retreating movements (Figure 38) the transfer carriers for the aprons 200, 210 are retreated a total of at least twenty-six and one-quarter inches. The same character and extent of retreating movement, of the carriers for the aprons 210 and 220 occurs when the parts are moved from the positions of Figure 33 to those of Figure 34.

Thereafter when each of the retreated, and then empty, transfer aprons is moved transversely into alignment with the main apron 100 to receive another batch of biscuit, it is then advanced again through at least fifteen inches during its receiving cycle, and that brings the transfer apron to the position indicated for the apron 200 in Figure 29 (and Figure 34). Thereafter, on the next transverse movement, the cam 336 advances the transfer apron carrier through an additional step in order to complete the advance thereof to the fixed and uniform extremity of its advance movement, preparatory to its next following retreating movement during which it delivers its batch of biscuit to the oven.

While each transfer apron is delivering biscuit to an oven band, the linear speed of the transfer apron over its delivery blade is synchronized with the speed of the oven band. And if the speed of the oven band is changed, the linear speed of the transfer apron, during its delivering cycle, may be correspondingly changed through adjustment by the hand-wheel 644 (Figures 2, 16 and 16a) as explained above. Hence, the travel of the oven band and the delivery operation of the transfer apron may be synchronized for any given set of conditions, but they are mutually adjustable to suit different conditions.

On the other hand, during the receiving operation of the transfer apron, while the main delivery apron 100 is depositing biscuit on the transfer apron, the movement of the main delivery apron 100 and the then receiving transfer apron, should be reconciled, as by making the speed of advance of the transfer apron (moving bodily with its carrier) equal to the linear speed of advance of the main transfer apron 100; or, if desired to suit special conditions, by making the speed of the transfer apron greater or less than that of the main apron 100. Since, however, the speed of linear travel of the main transfer apron 100 may be changed (through the transmission 401, 402, 403, Figure 4), to suit different conditions, the speed of advance of the receiving transfer apron carrier (by the advancing pusher 327, Figure 5) is rendered independently adjustable through the mechanism shown in Figures 17 and 32a, so that through varying the operation of the differential 477, 478, by adjustment of the hand-wheel 495, the speed of advance of the pusher 327 may be varied to reconcile the advance of the transfer apron with the linear advance of the main delivery apron 100.

If the typothetical thirty-inch batch of biscuit on the main apron 100 is desired to be deposited on the transfer aprons with the rows of biscuit farther apart or closer together than they were on the main apron, this operation is brought about by relatively adjusting the linear speed of the main apron 100 and the speed of advance of the transfer apron during its biscuit-receiving cycle. If it be assumed, for example, that the thirty-inch batch on the main apron is desired to be rearranged to form a twenty-six inch batch on the transfer apron, and the batch is to be deposited on the oven band in the same twenty-six inch length,—then the oven band speed should be reduced appropriately to the twenty-six inch length, and a corresponding slowing up of the speed of linear advance of the transfer apron should be made. Adjustment for this purpose may be made by adjusting the pivot pin 635 (Figure 16a) toward the right of the rock shaft 360.

If the hypothetical thirty-inch batch on the main apron is desired to be expanded, so to speak, to rearrange the biscuit in say a thirty-four inch batch on the transfer apron, and to deliver the batch to the oven band in the same thirty-four inch length, then to suit the delivery of that longer batch the oven band's travel may be speeded up and the linear speed of the transfer apron may be speeded up by the adjustment of the pivot pin 635 toward the left in Figure 16a.

Thus, the apparatus is capable of disposing on the transfer aprons batches which are either shorter or longer than the space occupied by the same series of biscuit on the main apron; and thereafter each batch may be deposited upon the oven bands with its biscuit in the same relationships which they had on the transfer apron.

If desired, however, the batches may be either lengthened or shortened as described, on the transfer aprons, and thereafter may be further lengthened or shortened when deposited on the oven bands. For example, the speed of the main apron 100 and the speed of the transfer apron during its receiving cycle may be relatively adjusted to cause a thirty-inch length of biscuit on the main apron to be shortened to a twenty-eight inch batch on the transfer apron; and then that twenty-eight inch batch may be deposited on the oven band as a twenty-six inch batch, by appropriately slowing down the oven band travel and then adjusting the linear advance speed of the transfer apron, during delivery, so that it will move somewhat faster than the oven band, this latter adjustment being made by the hand-wheel 644 acting on the pivot pin 635 (Figure 16a). In this manner, the relationship of biscuit on the main apron 100 may be modified in two steps, one during delivery to the transfer apron, and the second during delivery from the transfer apron to the oven band; and by performing this modification of relationship in two steps, the likelihood of distorting or crippling biscuit may be minimized, and the desired final relationships may be determined with a high degree of precision.

In summary, therefore, each transfer apron carrier is capable of separately and independently adjustable operations, one coordinated with the main delivery apron 100, and the other coordinated with the receiving oven band; and the described adjustments suffice to meet a wide range of conditions involved in the formation of biscuit in peels or as separate and differently spaced pieces, and in the different speeds of travel of the oven bands to suit different periods of baking.

Furthermore, the provision of an independent advancing movement of each transfer apron carrier (predetermined by the cams 336, 337, Figure 28) causes each transfer apron to reach, at the extremity of its advance movement, the proper position from which to begin delivering a new batch of biscuit with the advance edge of the new batch in such relation to the rear edge of the next preceding batch already deposited on the oven band, as to arrange successive batches in a continuous series of uniformly disposed biscuit. This result ensues from the fact that the transverse movements of the main delivery apron carriage (through the differential 271, 273, Figure 18) cause the cams 336, 337 (Figure 28), at the proper stage of the transverse movements, to move the transfer aprons through their final advance step in proper relationship to the advancing travel of the oven band. In other words, regardless of the other adjustments affecting other movements of the transfer apron, the final advance step thereof will occur at the proper time in the travel of the oven band to cause the deposit of successive batches of biscuit in the desired relation to each other already explained.

The speed adjustments for the advance pushers 327 may result in some variation in the distance through which the transfer apron carrier is advanced while receiving biscuit from the main apron 100. But such variation is negligible because the final advance step of the transfer apron carrier is actuated by the cams 336, 337 (Figure 3) independently of the pushers 327.

Likewise, the speed adjustments for the retreating pusher bar 342 (Figure 3) may vary the distances through which it is reciprocated, but that is negligible since the position of extreme advance, at which the transfer apron begins to deposit on an oven band, is determined by the cams 336, 337, quite independently of the pusher bar 342; while, after the transfer apron carrier has been returned to its position of extreme retreat, by the bar 342, the transfer apron carrier is then moved transversely out from operative engagement by the pusher 342. Subsequently, the advance of the transfer apron carrier, during its receiving cycle, is controlled by a pusher 327 the operation of which is independently synchronized with that of the main apron 100 and the main delivery blade 102, as already explained.

The circumstance that an apparatus embodying features of the present invention delivers the product of a single biscuit-forming apparatus, operating at relatively high speed, to numerous transversely spaced oven-receiving bands (or equivalent supporting areas at an oven) which may be moved at relatively low speed, presents important advantages, which will appear to those skilled in the art. For example, as already said, the illustrated oven bands, or their equivalents, may be moved at only about one-quarter of the linear speed of the main delivery apron 100, which means that the ovens need be only about one-quarter as long, to provide a given duration of baking, as would be required if the biscuit were delivered to only a single alignment in the oven. This permits a highly compact arrangement of the oven structure of relatively great transverse dimensions but minimized longitudinal dimensions, such that the conservation of heat is more readily effected and the utilization of floor space is greatly convenienced.

A conspicuous advantage in the illustrative machine resides in the circumstance that the entire operation of transferring biscuit from the main delivery apron into the oven involves a very brief time period and a very short distance of travel. It will be noted (Figures 33 and 34, for example) that the main delivery apron 100 is at all times in close proximity to the oven bands; and the total distance of longitudinal travel of a transfer apron between its initial receiving position and its depositing position is not substantially greater than the length of a single batch of biscuit. This results, in part, from the fact that while a transfer apron is receiving biscuit it is simultaneously moving into approximately that transverse alignment with the oven bands, at which the transfer aprons begin their delivery operation. That is to say, the receiving movement of the transfer apron is practically coextensive with the maximum longitudinal travel of the biscuit preparatory to deposit on the oven band, so that there is no waste of time or distance in transporting the biscuit from the main delivery apron to the oven bands.

A further feature of advantage inheres in the character of double duty performed by the illustrative transfer apron 210 (Figures 33 and 34). That apron delivers biscuit at one time (Figure 33) to the oven band 320, and at another time (Figure 37) to the oven band 310. This exemplifies a single transfer means which receives biscuit from a single source and then delivers batches in two different alignments.

It will be evident that the entire handling of biscuit from initial formation, through all of the steps of transportation, and throughout the baking operation, may be wholly automatic in the illustrated machine, while the precision of each delivery and transfer operation may be so well determined, and the coordination of the operations may be so well assured, by the various adjustments, that the biscuit (whether in peels or separate pieces) always will be maintained or disposed in desired condition and relationship and may be ultimately delivered to the oven in a continuous succession of uniformly disposed biscuit to eventuate in a uniformly baked product with minimized waste.

As will readily appear to those skilled in the art, the illustrative machine shown in the drawings and described above may be variously modified for the purpose of utilizing all or some of the features of this invention. It is not necessary that all of the features of the invention be conjoined in a single apparatus since various features may be employed separately or in such combinations as are indicated in the claims appened hereto.

I claim:

1. Apparatus of the character described comprising, in combination, a main delivery apron; means to move said apron continuously at uniform speed; a reciprocable main delivedy blade cooperating with said apron, over which said apron is arranged to pass; three transfer apron carriers each having a transfer apron mounted thereon; a carriage common to said three carriers, mounted for movement transversely of the direction of movement of said main delivery apron, said three carriers being mounted for individual movement on their common carriage in a direction parallel to the direction of movement of said main delivery apron; means relatively to operate the main delivery apron, its delivery blade, and respective transfer apron carriers, for depositing biscuit in respective batches from the main delivery apron onto the transfer aprons; adjustable means for reconciling speeds of operation of the main delivery apron, its delivery blade and the transfer apron carriers, for depositing biscuit on the transfer aprons in respective batches with the biscuit disposed in relationships the same as or different from those which the biscuit have on the main transfer apron; receiving means at an oven, arranged with biscuit-receiving areas in four different alignments; means for transversely moving the transfer apron carriage to present respective transfer aprons in cooperative relation with the main delivery apron, and for aligning transfer aprons, two at a time, with respective pairs of the receiving areas at the oven; means for relatively positioning the transfer apron carriers and the receiving areas of the oven, for delivery of biscuit from the former to the latter; and adjustable means relatively to reconcile speeds of operation of the transfer aprons and the receiving means at the oven, for delivering biscuit from the former to the latter.

2. Apparatus of the character described comprising, in combination, a main delivery apron; means to move said apron continuously at uniform speed; a reciprocable main delivery blade cooperating with said apron, over which said apron is arranged to pass; a plurality of transfer apron carriers each having a transfer apron mounted thereon, said carriers being mounted for movement transversely of the direction of movement of said main delivery apron, and also for individual movement in a direction parallel to the direction of movement of said main delivery apron; means relatively to operate the main delivery apron, its delivery blade, and respective transfer apron carriers, for depositing biscuit in respective batches from the main delivery apron onto the transfer aprons; adjustable means for reconciling speeds of operation of the main delivery apron, its delivery blade and the transfer apron carriers, for depositing biscuit on the transfer aprons in respective batches with the biscuit disposed in relationships the same as or different from those which the biscuit have on the main transfer apron; receiving means at an oven structure, arranged with biscuit-receiving areas in a plurality of different alignments; means for transversely moving the transfer apron carriers to present respective transfer aprons in cooperative relation with the main delivery apron, and for aligning transfer aprons with respective receiving areas at the oven; means for relatively positioning the transfer apron carriers and the receiving areas of the oven, for delivery of biscuit from the former to the latter; and adjustable means relatively to reconcile speeds of operation of the transfer aprons and the receiving means at the oven, for delivering biscuit from the former to the latter.

3. Apparatus of the character described comprising, in combination, a movable main delivery apron; a main delivery blade cooperating with said apron, over which said apron is arranged to pass; a plurality of transfer apron carriers each having a transfer apron mounted thereon, said carriers being mounted for movement transversely of the direction of movement of said main delivery apron, and also for individual movement in a direction parallel to the direction of movement of said main delivery apron; means relatively to operate the main delivery apron and respective transfer apron carriers, for depositing biscuit in respective batches from the main delivery apron onto the transfer apron; adjustable means for reconciling speeds of operation of the main delivery apron, its delivery blade and the transfer apron carriers, for depositing biscuit on the transfer aprons in respective batches; receiving means at an oven structure, arranged with biscuit-receiving areas in a plurality of different alignments; means for transversely moving the transfer apron carriers to present respective transfer aprons in cooperative relation with the main delivery apron, and for aligning transfer aprons with respective receiving areas at the oven; means for relatively positioning the transfer apron carriers and the receiving areas of the oven, for delivery of biscuit from the former to the latter; and adjustable means relatively to reconcile speeds of operation of the transfer aprons and the receiving means at the oven, for delivering biscuit from the former to the latter.

4. Apparatus of the character described comprising, in combination, a movable main delivery apron; a main delivery blade cooperating with said apron, over which said apron is arranged to pass; a plurality of transfer apron carriers each having a transfer apron mounted thereon, said carriers being mounted for collective transverse movement and for individual longitudinal movement; means relatively to operate the main delivery apron and respective transfer apron carriers, for depositing biscuit in respective batches from the main delivery apron onto the transfer aprons; receiving means at an oven structure, arranged with biscuit-receiving areas in a plurality of different alignments; means for transversely moving the transfer apron carriage to present respective transfer aprons in cooperative relation with the main delivery apron, and for aligning transfer aprons with respective receiving areas at the oven; means for relatively positioning the transfer apron carriers and the receiving areas of the oven, for delivery of biscuit from the former to the latter.

5. Apparatus of the character described comprising, in combination, a movable main delivery apron; a plurality of transfer apron carriers each having a transfer apron mounted thereon, said carriers being mounted for movement transversely and longitudinally; means relatively to operate the main delivery apron and respective transfer apron carriers, for depositing biscuit in respective batches from the main delivery apron onto the transfer aprons; adjustable means for reconciling operation of the main delivery apron and the transfer apron carriers, for depositing biscuit on the transfer aprons in respective batches with the biscuit disposed in desired relationships; means for transversely moving the transfer apron carriage to present respective transfer aprons in cooperative relation with the main delivery apron, and for aligning transfer aprons with respective receiving areas at the oven; and adjustable means relatively to reconcile operation of the transfer aprons and the receiving means at the oven, for delivering biscuit from the former to the latter.

6. Apparatus of the character described comprising, in combination, main delivery means delivering biscuit in one alignment; receiving means at an oven having biscuit-receiving areas in a plurality of different alignments; a plurality of transfer means, having a surface to receive, support and carry the biscuit, movable from alignment with the main delivery means into alignment with said respective receiving means, for transporting biscuit in batches from delivering to receiving means; and actuating mechanism for said elements; the transfer means comprising a support and individual transfer devices movable transversely of said support, and guiding means for causing the support and transfer devices to move rectilinearly in substantially horizontal plane.

7. Apparatus of the character described comprising, in combination, main delivery means delivering biscuit in one alignment; receiving means at an oven having biscuit-receiving areas in a plurality of different alignments; a plurality of transfer means movable from alignment with the main delivery means into alignment with said respective receiving means, for transporting biscuit in batches from one to the other; means for causing the transfer means, one at a time, to take biscuit from said delivery means; and means for causing the transfer means to deliver the biscuit to said receiving means; the transfer means comprising a support and individual transfer devices movable transversely of said support, and guiding means for causing the support and transfer devices to move rectilinearly in substantially horizontal plane.

8. Apparatus of the character described comprising, in combination, main delivery means delivering biscuit in one alignment; receiving means at an oven having biscuit-receiving areas in a plurality of different alignments; a plurality of transfer means movable from alignment with the main delivery means into alignment with said respective receiving means, for transporting biscuit in batches from one to the other; means for causing the transfer means, one at a time, to take biscuit from said delivery means; and means for causing the transfer means, a plurality thereof at a time, to deliver biscuit to said receiving means.

9. Apparatus of the character described comprising, in combination, main delivery means delivering biscuit in one alignment; receiving means at an oven having biscuit-receiving areas in a plurality of different alignments; a plurality of transfer means, less in number than said plurality of alignments of receiving means, movable from alignment with the main delivery means into alignment with said respective receiving means, for transporting biscuit in batches from one to the other; and means for causing the transfer means to take batches from the delivery means and to deliver batches to all the alignments of the receiving means.

10. Apparatus of the character described comprising, in combination, a continuously moving main transfer apron for delivering biscuit; biscuit-receiving means at an oven having four biscuit-receiving areas each traveling at substantially one-fourth of the speed of said main delivery apron; and transfer means, intermediate the main delivery apron and said biscuit-receiving areas at the oven, said transfer means having areas operative in succession to receive all the biscuit delivered by said main delivery apron; and means for operating different elements of the transfer means, in alternation, for delivering substantially equal quotas to respective biscuit-receiving areas at the oven.

11. Apparatus of the character described comprising, in combination, a main delivery apron and means for moving the same to deliver biscuit therefrom; means to vary the speed of movement of the main delivery apron; biscuit-receiving means at an oven; means for causing said biscuit-receiving means to travel; means for changing the speed of travel of said biscuit-receiving means; transfer means intermediate the main delivery apron and said biscuit-receiving means; means for moving the transfer means from operative relationship with the main delivery apron to operative relationship with said biscuit-receiving means; and means for reconciling the speed of movement of the transfer means with the speed of travel of said biscuit-receiving means.

12. Apparatus for mechanically feeding biscuits from a cutting machine output conveyor to a plurality of oven conveyors traveling at a speed different from that of said cutting machine conveyor comprising a shuttle panner adapted to be moved transversely of the cutting machine conveyor between a position under the conveyor for receiving batches of biscuits therefrom and a position laterally of the conveyor for panning the biscuits, and mechanism for moving the shuttle panner transversely and for imparting panning action to it in timed relation to the travel of said cutting machine conveyor.

13. An apparatus as claimed in claim 12 wherein the shuttle panner comprises a conveyor band adapted to receive a batch of biscuits panned from the cutting machine conveyor, said band carried by a support or frame displaceable transversely with respect to the cutting machine conveyor, and a support or frame for the conveyor band having its forward edge capable of reciprocation lengthwise of the band for panning the biscuits from the shuttle element.

14. In an apparatus for feeding biscuits from a cutting machine output conveyor to a plurality of ovens, a shuttle element comprising in combination a conveyor band adapted to receive one or more batches of biscuits side by side from the cutting machine conveyor and a support for said band displaceable laterally of said output conveyor and having its forward edge reciprocable lengthwise of said conveyor band, said band being adapted for longitudinal movement relative to its support.

15. Apparatus as claimed in claim 14, wherein the band is anchored to a controlling mechanism, the support is reciprocable longitudinally under the band and said controlling mechanism is capable of traversing the band longitudinally relatively to the support.

16. Apparatus for mechanically feeding biscuits from a cutting machine output conveyor to a plurality of oven conveyors, comprising a shuttle panner adapted to move transversely of said cutting machine conveyor between a position under said conveyor for receiving batches of biscuits therefrom and a position laterally of said conveyor for panning the biscuits.

17. Apparatus of the character described comprising, in combination, main delivery means delivering biscuit in one alignment; receiving means at an oven having biscuit-receiving areas in a plurality of different alignments; a plurality of transfer means movable from alignment with the main delivery means into alignment with said respective receiving means, for transporting biscuit in batches from one to the other, said delivery means, receiving means and transfer means having a succession of biscuit-receiving, supporting and carrying aprons each, in succession, receiving and supporting biscuit from beneath; actuating means relatively operating the delivery and transfer means to deliver individual biscuit-batches progressively from a delivery apron onto a transfer apron; means for positioning the transfer means in cooperative relation with different alignments of the biscuit-receiving areas; and actuating means relatively operating the transfer means and receiving means to deliver individual biscuit-batches progressively from a transfer apron onto a receiving apron.

18. Apparatus of the character described comprising, in combination, main delivery means delivering biscuit in one alignment; receiving means at an oven having biscuit-receiving areas in a plurality of different longitudinal alignments; transfer means intermediate the main delivery means and said receiving means; each of said delivery, receiving, and transfer means having substantially flat supporting aprons upon which biscuit may be transported and delivered from the delivery apron to a transfer apron and from the latter to said receiving means; actuating means relatively operating the delivery and transfer means to deliver individual biscuit-batches progressively from the delivery apron onto a transfer apron; means for moving the transfer means, carrying individual biscuit-batches on an apron, from alignment with the delivery means into alignment with said receiving means; and actuating means relatively operating the transfer means and receiving means to deliver individual biscuit-batches progressively from a transfer apron to a receiving means.

19. Apparatus of the character described comprising, in combination, biscuit-delivering means for delivering biscuit along a single alignment; biscuit-receiving means at an oven arranged to receive batches of biscuit on a plurality of different alignments; and transfer means, intermediate said delivering and receiving means, comprising a plurality of aprons to receive, support and transport respective batches of biscuit delivered by said delivery means; actuating means relatively operating the delivering and transfer means to deliver individual biscuit-batches progressively from the delivery means onto a transfer apron; means for positioning each transfer apron in cooperative relation with the biscuit-receiving area; and actuating means relatively operating the transfer means and receiving means to deliver individual biscuit-batches progressively from a transfer apron onto a receiving area.

20. Apparatus of the character described comprising, in combination, biscuit-delivering means, and transfer means and receiving means, each having substantially continuous biscuit-receiving and supporting aprons; the delivering means delivering in a single alignment; the receiving means arranged to receive biscuit on a plurality of different alignments; means for presenting a transfer apron in close proximity to the delivering means for transferring biscuit from the support of the latter to the support of the former; actuating means relatively operating the delivery and transfer means to deliver individual biscuit-batches progressively from the delivery means onto a transfer apron; means for aligning transfer aprons with respective alignments of receiving means, and for spacing transfer aprons and receiving means in close proximity, to discharge biscuit from the support of one to the support of the other; and actuating means relatively operating the transfer means and receiving means to deliver individual biscuit-batches progressively from a transfer apron onto a receiving means.

21. Apparatus of the character described, comprising in combination, biscuit-delivering means for delivering biscuit along a single alignment; means for moving said delivering means to deliver biscuit therefrom at relatively high speed; biscuit-receiving means at an oven having biscuit-receiving areas at four different longitudinal alignments; means for moving said biscuit-receiving areas at approximately one-fourth of the speed of the delivering means; transfer means having a transfer apron to receive, support and transport biscuit; actuating means relatively operating the delivering and transfer means to deliver biscuit progressively from the delivering means onto a transfer apron in coordination with the relatively high speed of biscuit delivery; means operating the transfer means to transport to alignment with each receiving area, one-fourth of the total output from the delivering means; and actuating means relatively operating the transfer means and receiving means to deliver biscuit progressively from a transfer apron onto a receiving area in coordination with the relatively low speed of the receiving area.

22. Apparatus of the character described, comprising, in combination, biscuit-delivering means for delivering biscuit along a single alignment; means for moving said delivering means to deliver biscuit therefrom at relatively high speed; biscuit-receiving means at an oven having biscuit-receiving areas at a plurality of different longitudinal alignments; means for moving said biscuit-receiving areas at a speed which is approximately that fraction of the speed of the delivering means represented by one divided by the number of said plurality of biscuit-receiving alignments; transfer means having a transfer apron to receive, support and transport biscuit; actuating means relatively operating the delivering means and transfer apron to deliver biscuit progressively from the delivering means onto the transfer apron in coordination with the relatively high speed of biscuit delivery; means operating the transfer apron to transport to alignment with each receiving area approximately a fraction of the total output of the delivering means represented by one divided by the number of said plurality of biscuit-receiving alignments; and actuating means relatively operating the transfer means and receiving means to deposit biscuit progressively from a transfer apron onto a receiving area in coordination with the relatively low speed of the receiving area.

23. Apparatus of the character described, comprising, in combination, biscuit-delivering means, having a continuously moving biscuit supporting surface, for delivering biscuit along a single alignment; means for moving said delivering means to deliver biscuit therefrom at relatively high speed; biscuit-receiving means at an oven having biscuit-receiving areas at a plurality of different longitudinal alignments; means for moving said biscuit-receiving areas at a speed which is approximately that fraction of the speed of the delivering means represented by one divided by the number of said plurality of biscuit-receiving alignments; transfer means intermediate said delivering and receiving means having a plurality of biscuit-supporting aprons, less in number than said biscuit-receiving alignments, to receive successively respective batches of biscuit from said delivering means; actuating means relatively operating the delivering and transfer means to deliver biscuit progressively from the delivering means onto the respective transfer aprons in coordination with the relatively high speed of biscuit delivery; means operating the transfer means to move respective transfer aprons into cooperative relationship with all the alignments of the biscuit-receiving areas; and actuating means relatively operating the transfer means and receiving means to deliver biscuit progressively from respective transfer aprons onto respective receiving areas in coordination with the relatively low speed of the receiving areas.

THOMAS L. GREEN.